US012239053B2

(12) United States Patent
Lawrence

(10) Patent No.: US 12,239,053 B2
(45) Date of Patent: Mar. 4, 2025

(54) SYSTEM FOR MODERATING ENERGY ABSORPTION AT THE EARTH'S SURFACE WITH A PROGRAMMABLE FORCING NETWORK OF CLIMATE CONTROL PANELS

(71) Applicant: Douglas Lawrence, Wilmington, DE (US)

(72) Inventor: Douglas Lawrence, Wilmington, DE (US)

(*) Notice: Subject to any disclaimer, the term of this patent is extended or adjusted under 35 U.S.C. 154(b) by 0 days.

(21) Appl. No.: 18/583,953

(22) Filed: Feb. 22, 2024

(65) Prior Publication Data

US 2024/0247838 A1 Jul. 25, 2024

Related U.S. Application Data

(63) Continuation-in-part of application No. PCT/US2022/075433, filed on Aug. 25, 2022.

(Continued)

(51) Int. Cl.
F24S 20/67 (2018.01)
A01G 13/02 (2006.01)
(Continued)

(52) U.S. Cl.
CPC ......... *A01G 13/0275* (2013.01); *A01G 15/00* (2013.01); *F24S 20/67* (2018.05);
(Continued)

(58) Field of Classification Search
CPC .................................. F24S 20/67; F24S 50/80
(Continued)

(56) References Cited

U.S. PATENT DOCUMENTS 2,857,634 A 10/1958 Garbade
4,128,307 A * 12/1978 Badertscher ........... A01G 9/222
49/82.1

(Continued)

FOREIGN PATENT DOCUMENTS

| CH | 611674 A5 | 6/1979 |
| DE | 1020070168 A1 | 9/2008 |
| GB | 2438156 A | 11/2007 |
| WO | 2008104568 A1 | 9/2008 |
| WO | 2009135398 A1 | 11/2009 |

OTHER PUBLICATIONS

International Search Report and Written Opinion in respect of PCT/US2022/075433 mailed Nov. 24, 2022.

*Primary Examiner* — Avinash A Savani
(74) *Attorney, Agent, or Firm* — Rogowski Law LLC

(57) ABSTRACT

A dynamic controllable system for moderating energy absorption at the earth's surface includes a series of panel units mounted above the earth's surface over land and water masses or on buildings. Each panel unit supports rotatable shafts, with panels joined to or integrally formed with the shafts. Each panel (forcing) has a radiation reflective surface and a radiation emissive surface opposite the radiation reflective surface. The panels are selectively rotated into a predetermined one cardinal positions: reflective, emissive and neutral, or into an intermediate position between cardinal positions. The programmable controller receives various data including top of atmosphere satellite data, air temperature and relative humidity at panel units, weather data, time of day, position of panel units, radiation insolation, and combinations thereof. Responsive to real-time data, both local and regional, the programmable controller directs rotational orientation of panels, causing a desired reflection of shortwave and longwave radiation away from the earth's surface.

30 Claims, 24 Drawing Sheets

Related U.S. Application Data

(60) Provisional application No. 63/238,373, filed on Aug. 30, 2021.

(51) Int. Cl.
*A01G 15/00* (2006.01)
*F24S 21/00* (2018.01)
*F24S 30/42* (2018.01)
*F24S 50/80* (2018.01)

(52) U.S. Cl.
CPC .............. *F24S 21/00* (2018.05); *F24S 30/42* (2018.05); *F24S 50/80* (2018.05)

(58) Field of Classification Search
USPC ........................................................ 126/701
See application file for complete search history.

(56) References Cited

U.S. PATENT DOCUMENTS

| | | | | |
|---|---|---|---|---|
| 4,144,931 | A | * | 3/1979 | Medico, Jr. ........... F24S 10/753 126/633 |
| 4,219,008 | A | | 8/1980 | Schultz |
| 4,284,069 | A | | 8/1981 | Hoerster |
| 4,739,748 | A | | 4/1988 | Stice |
| 8,915,015 | B1 | * | 12/2014 | Augspurger ............. A01G 9/14 47/17 |
| 2010/0300429 | A1 | | 12/2010 | McNeil-Yeckel |
| 2012/0067337 | A1 | | 3/2012 | Hall |
| 2014/0200717 | A1 | * | 7/2014 | Tilley ........................ G05F 1/67 700/275 |
| 2018/0054156 | A1 | * | 2/2018 | Lokey .................... G05D 3/105 |

\* cited by examiner

SYSTEM FOR MODERATING ENERGY ABSORPTION AT THE EARTH'S SURFACE WITH A PROGRAMMABLE FORCING NETWORK OF CLIMATE CONTROL PANELS

CROSS-REFERENCE TO RELATED APPLICATIONS

This application is a continuation in part application (under 35 USC § 120) of PCT/US2022/075433, filed Aug. 25, 2022, which claims benefit of U.S. 63/238,373, filed Aug. 30, 2021, the contents of each of which is incorporated by reference herein.

FIELD OF THE INVENTION

The present invention is generally directed to a dynamic system to moderate energy absorption and energy emission (both longwave and shortwave) at the earth's surface utilizing a network of programmable climate control panels deployed above the earth's surface (over land and/or water masses). The programmable climate control panels may be installed on building roofs or vertical walls to cool subtending regions. Arrays of the programmable climate control panels may direct prevailing winds or sea breezes toward urban heat islands to enhance daytime cooling.

BACKGROUND OF THE INVENTION

The current climate of the earth is said to be in a state of crisis as evidenced by a continual rise in the average global surface temperature, which is typically referred to as "global warming". This increasing temperature trend is associated with and blamed upon an increase in atmospheric concentrations of carbon dioxide ($CO_2$) and other green house gases ("GHG") such as methane and nitrous oxide as brought on by human activities that are centered around the burning of fossil fuels and other human activities (that increase methane and nitrous oxide) since the onset of the industrial age. Associated with this temperature rise are a variety of disruptions and problems, including sea level rise, adverse agricultural impacts, and greater numbers of severe weather events (droughts, excessive rainfall, hurricanes and storms).

The consequences of global warming include significant economic impact. An analysis of the Economic Impact of Global Warming has been the subject of many studies, including the Nobel Prize winning study by expert William Nordhaus. Dr. Nordhaus invented the modern economics of climate change, starting with his 1979 book on the subject. He and others developed the Dynamic Integrated Model of Climate and the Economy ("DICE") and summarized the relative economic impacts of different climate policies. Table 1 reproduces a table from Murphy (2009), p. 211 (https://www.econlib.org/library/Columns/y2018/MurphyNordhaus.html) showing the economic cost associated with global warming as a baseline without remediation, which baseline cost is estimated to be over 22 trillion US dollars. Various potential mediation plans are also estimated to cost trillions of US dollars.

TABLE 1

DICE's Relative Benefits of Different Climate Policies (DICE-2007) (in Trillions of 2005 U.S. $)

| Climate Policy | PDV Difference from Baseline | PDV of Environmental Damages | PDV of Abatement Costs | Sum of Damages and Costs |
| --- | --- | --- | --- | --- |
| No controls baseline | 0.00 | 22.55 | 0.04 | 22.59 |
| Optimal tax | +3.07 | 17.31 | 2.20 | 19.52 |
| Limit $CO_2$ to 560 ppm | +2.67 | 15.97 | 3.95 | 19.92 |
| Kyoto with the United States | +0.63 | 21.38 | 0.58 | 21.96 |
| Kyoto without the United States | +0.10 | 22.43 | 0.07 | 22.49 |
| Stern Review discount rate | −14.18 | 9.02 | 27.74 | 36.77 |
| Limit temp. to 1.5° C. | −14.44 | 9.95 | 27.08 | 37.03 |
| Limit $CO_2$ to 420 ppm | −14.60 | 9.95 | 27.24 | 37.19 |
| Gore's 90 percent emissions cut | −21.36 | 1.05 | 33.90 | 43.96 |

Note:
PCV = present discounted value.
Source: Table 4 from *Murphy* (2009), p. 211, Adapted from Nordhaus 2008, 89.

Proposed responses to mitigate the global warming problem and its associated effects fall into two basic categories: (a) $CO_2$ mitigation; and (b) geoengineering solutions. Mitigating $CO_2$ requires that less fossil fuel be burned, with society forced to use alternate forms of energy, such as wind and solar. This is an indirect attack on the offending cause of global warming, trying to cap or minimize future additions of $CO_2$ into earth's atmosphere, without moderating the incoming radiation energy from the sun. Current practice has been to pursue the slowdown of $CO_2$ emissions so as not to make further concentration of this greenhouse gas worse. This has resulted in the formation of the Intergovernmental Panel on Climate Change (IPCC), which issues policy advice that accepts and focuses on reducing human activity. Because of the enormous economic penalties of this solution, it is deemed unacceptable by many.

Modern cities with buildings, roads, sidewalks and other hardscaped surfaces create urban heat islands that absorb solar radiation without effectively emitting the radiation back to the atmosphere at night. Cities seek to mitigate excessive radiation heating by creating more "green" spaces by planting trees or other vegetation, and by building new structures with materials that are more radiation reflective. These current solutions do not sufficiently address the urban heat island problem resulting from existing city infrastructure.

Geoengineering solutions attempt to moderate the incoming radiation or shortwave surface reflections from the sun. Examples of geoengineering solutions include: (1) introducing aerosol particles into earth's atmosphere to block incoming radiation; (2) planting certain crops that are more reflective; (3) changing the materials used for surfaces of roofs and for pavements in urban areas to be more reflective; and (4) putting reflective spheres into the earth's atmosphere or into outer space just outside the earth's atmosphere. Table 2 below compares anticipated effectiveness of geoengineering proposals (identified as ALBEDO modification proposals) with carbon dioxide reduction proposals. Geoengineering solutions have been deemed unacceptable to date, and as a result, none have been pursued.

TABLE 2

Overview of General Differences between Carbon Dioxide Removal Proposals and Solar Radiation Management

| Carbon dioxide removal proposals . . . | Albedo modification proposals . . . |
|---|---|
| . . . address the cause of human-induced climate change (high atmospheric GHG concentrations). | . . . do not address cause of human-induced climate change (high atmospheric GHG concentrations). |
| . . . do not introduce novel global risks. | . . . introduce novel global risks. |
| . . . are currently expensive (or comparable to the cost of emission reduction). | . . . are inexpensive to deploy (relative to cost of emissions reduction). |
| . . . may produce only modest climate effects within decades. | . . . can produce substantial climate effects within years. |
| . . . raise fewer and less difficult issues with respect to global governance. | . . . raise difficult issues with respect to global governance. |
| . . . will be judged largely on questions related to cost. | . . . will be judged largely on questions related to risk. |
| . . . may be implemented incrementally with limited effects as society becomes more serious about reducing GHG concentrations or slowing their growth. | . . . could be implemented suddenly, with large-scale impacts before enough research is available to understand the risks relative to inaction. |
| . . . require cooperation by major carbon emitters to have a significant effect. | . . . could be done unilaterally. |
| . . . for likely future emissions scenarios, if abruptly terminated would have limited consequences. | . . . for likely future emissions scenarios, if abruptly terminated would produce significant consequences. |

Note:
GHG stands for greenhouse gases released by human activities and natural processes and includes carbon dioxide, methane, nitrous oxide, chlorofluorocarbons, and others. The committee intends to limit discussion to proposals that raise the fewest problematic issues, thus excluding ocean iron fertilization from the CDR list. Each statement may not be true of some proposals within each category.

Table 2 shows that there are significant positives to geoengineering solutions. They are less expensive to implement and can produce results within years. They can be implemented quickly and unilaterally, and could produce large impacts. Notwithstanding these positives, geoengineering solutions are presumed to introduce novel global risks, such as potential to change global weather patterns. Moreover, some geoengineering proposals, such as painting roofs white or planting reflective crops, lack the efficacy needed to compensate for global warming at current $CO_2$ and other GHG levels.

What is needed is a solution to mitigate global warming at current GHG or increased GHG levels with sufficient efficacy combined with low or no risk to changing earth's weather patterns, which can be accomplished at a lower economic cost and impact than the high-priced GHG reduction plans which are current being pursued by the IPCC and the Paris Climate Agreement. Further needed are solutions to address urban heat islands and particularly to cool cities with substantial hardscaped surfaces.

BRIEF SUMMARY OF THE INVENTION

A system for moderating energy absorption at the earth's surface has multiple panel units each configured to support at least one rotatable shaft. A panel is joined to or integrally formed with each shaft. Each panel has a radiation reflective surface and a radiation emissive surface opposite the radiation reflective surface.

The system further has means for rotating the shaft to place the panel selectively into each of a plurality of predetermined cardinal positions selected from the group consisting of: reflective orientation, emissive orientation and neutral orientation. The radiation reflective surface may be one of a number of reflective materials, such as but not limited to, aluminum, gold, silver or engineered films that have reflectivity of about 95% or higher. The radiation reflective surfaces of the panels reflect shortwave radiation and longwave radiation.

The emissive surface may be formed of a material or have applied thereto a material that is radiation absorptive, such as but not limited to, carbon black, soot, platinum black and carborundum. The radiation emissive surfaces of the panels absorb shortwave and longwave radiation, and have emissivities that are greater than about 95% over the full black body spectrum.

One such means comprises a step motor or other motor suitable for engagement with a rotatable shaft. The motor shall control the angle of the panels based on rotary position feedback. A local programmable controller can provide standard day time functionality, such as sun tracking and nighttime horizontal positioning. This controller can also receive downline loads from the remote Global Command Center. The Global Command Center algorithms are based on various climate data, such as top of atmosphere satellite data, air temperature at panel unit, relative humidity at panel unit, weather data, time of day, position of panel unit, radiation insolation, and combinations thereof.

In a preferred embodiment, each panel unit has a frame to which the rotatable shafts are attached. The panel unit is mounted spaced a distance of at least 1 meter above a ground surface, or at least one meter above a water surface (such as the ocean or a lake). The installation height range optimally is between 1 meter and 3 meters above a ground or support surface. The frame defines air passageways to direct air below the panel. Optimally, the panel units are positioned at predetermined mid-latitude locations on the earth, such as at the equator or in regions that are within a range of latitude between 40° N and 40° S.

In another preferred embodiment, each panel unit has a series of pairs of support posts, with each pair spaced apart from one another by a length to accommodate a panel. Bearing units associated with the support posts receive the shaft to which the panel is joined. The shafts of multiple panels may be supported by different pairs of support posts, arranged to form a grid or collection of panels that comprise the panel unit. The shafts of the panels may be rotated by dedicated individual motors or by a motor coupled to a linkage so as to rotate multiple shafts in coordination with one another as dictated by the programmable controller. The pairs of support posts may be installed without a surrounding frame. An optimal installation panel height range is between 1 meter and 3 meters above a ground or support surface.

In one embodiment, some of the panel units may be maintained in a fixed bias in which all or substantially all panels therein have panel surfaces maintained in one of the cardinal positions, such as the reflective orientation or the emissive orientation.

A second aspect of the invention is a method for reducing radiation energy absorption at the earth's surface by installing a plurality of the inventive systems above the earth's surface at predetermined distribution locations and selectively rotating the shafts of the panels in the panel units with the means for rotating the shafts controlled by a programmable controller.

The panel units are installed over land masses and water masses. For highest heat reduction, it is optimum to install at the equator or in regions that are considered mid-latitude or within a range of latitude between 40° N and 40° S. This preferred region is also coincident with the major desert climates which are prime target areas.

The panel units may be installed in urban areas to effectively cool the ambient air temperature. The panels with their panel orientation controlled with their programmable controller effect a diurnal cooling, meaning a dual mode solution that cools both during the day and during the night. The system maximizes the amount of reflected energy to achieve cooling. In daytime, the reflective surface of the panels offers full spectrum reflection of both shortwave and long wave radiation. In nighttime, the emissive surface of the panels emits long wave radiation into the atmosphere, while the region below the panels is free to emit radiation as well. Panel units may be mounted to building roofs and/or to building walls to cool subtending regions during the daytime by reflecting radiation to the atmosphere and shading regions below the panels. In nighttime, the panels may be rotated to neutral or emissive orientations to enhance diurnal cooling.

The panels within a panel unit may be variously rotated to place the panels at a predetermined one of each of the cardinal positions as well as to a predetermined rotational position that is between two of the cardinal positions. Most often, the panels within one panel unit will be rotated to a same rotational orientation, and at a given time, the panels within different panel units will be rotatable to different rotational orientations. The rotational orientation of the panels of each panel unit of a multiplicity of panel units shall be dynamically controlled by the programmable controller. It is further envisioned that in some regions, fixed bias panel units will be installed, in which all or substantially all panels therein have panel surfaces maintained in one of the cardinal positions, either in the reflective orientation or in the emissive orientation.

Arrays of panel units may be installed to enhance the effects of prevailing winds. The shafts to which the panels are mounted may be rotated at desired rpm to generate circulating air under the panels and in regions adjacent to the panels. By such rotation, the panels may fan air, such as prevailing cooling winds, toward regions, such as urban centers, where increased cooling is desired.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a global climate control system that is presently preferred. It should be understood, however, that the disclosure is not limited to the precise arrangements and instrumentalities shown. In the drawings.

DESCRIPTION OF THE DISCLOSURE

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s). The following description is provided to enable any person skilled in the art to make and use the invention and sets forth the best modes contemplated by the inventors of carrying out their invention. Various modifications, however, will remain readily apparent to those skilled in the art without departing from the spirit and scope of the invention, which is defined by the accompanying claims.

It should be noted that steps recited in any method claims below do not necessarily need to be performed in the order in which they are recited. Those of ordinary skill in the art will recognize variations in performing the steps from the order in which they are recited. In addition, the lack of mention or discussion of a feature, step or component provides the basis for claims where the absent feature or component is excluded by way of a proviso or similar claim language.

Figure 1:
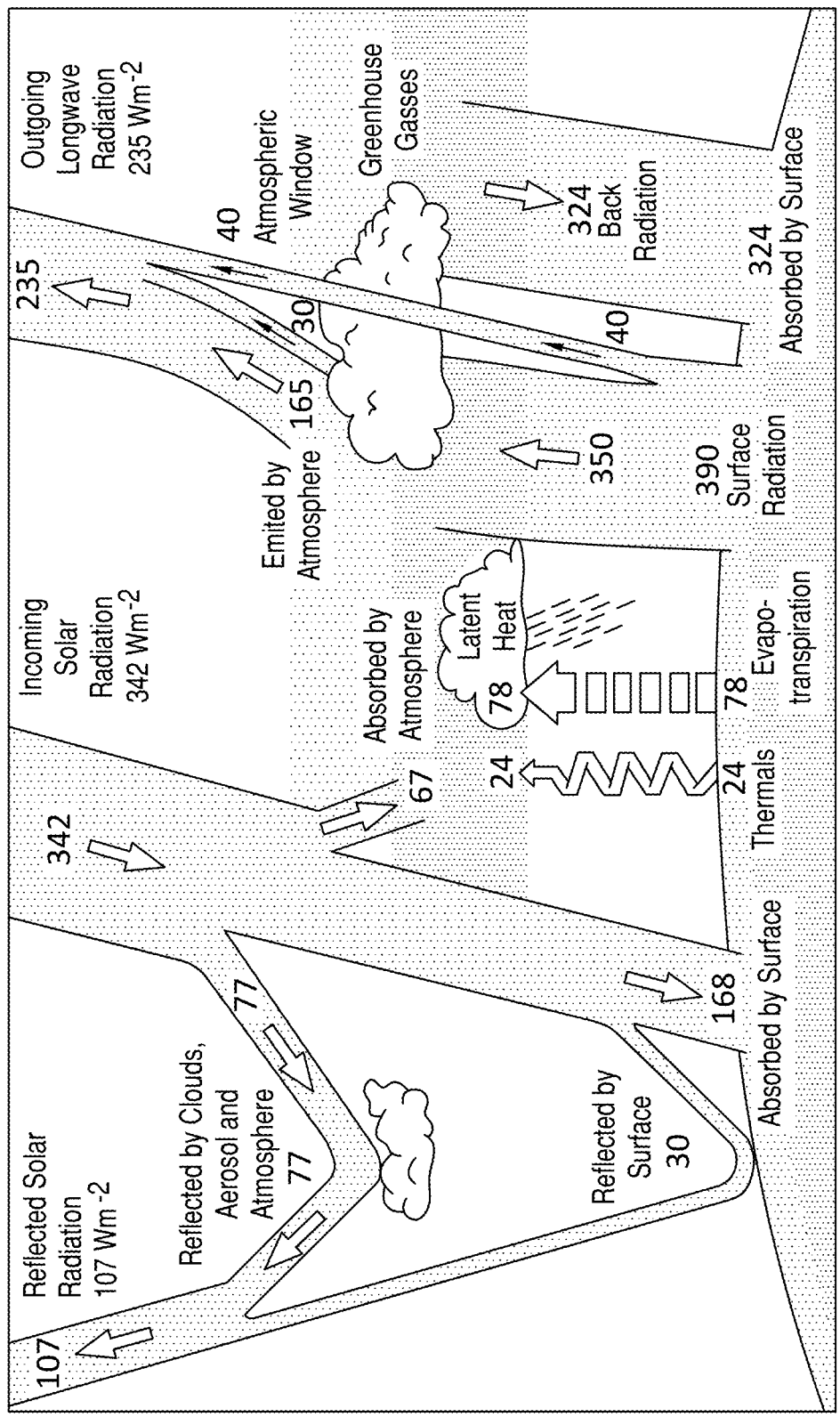
FIG. 1 is a schematic diagram illustrating the earth's annual and global mean energy balance, showing incoming and outgoing solar radiation.

FIG. 1 illustrates the earth's annual and global mean energy balance, showing incoming and outgoing solar radiation. The average top of the atmosphere (TOA) incoming solar radiation (longwave and shortwave) is 342 Watts per square meter ($Wm^{-2}$) in a given year. That heat is returned to the atmosphere as sensible heat, as evapotranspiration (latent heat), and as thermal infrared radiation (longwave radiation). Most of this radiation is absorbed by the earth's atmosphere, which in turn emits radiation both up and down.

Referring to FIG. 1, the insolation of the earth at the top of the atmosphere is on average estimated at 342 $Wm^{-2}$. The radiation that escapes from the top of the atmosphere is characterized as shortwave 107 and longwave 235 components. The shortwave 107 is called off at 107 $Wm^{-2}$ and the longwave 235 is called off at 235 $Wm^{-2}$, which gives a total 342 $Wm^{-2}$, equaling the insolation. If the shortwave radiation 107 and/or the longwave radiation 235 that escapes the atmosphere can be increased, then the earth overall will experience cooling. Conversely, if there is a reduction in the amount of radiation that escapes the atmosphere, the earth overall will experience a temperature increase. In the case of greenhouse gases, increasing the amount of GHG in the earth's atmosphere makes it more difficult for longwave radiation to escape, and the temperature of the earth increases.

Figure 2:
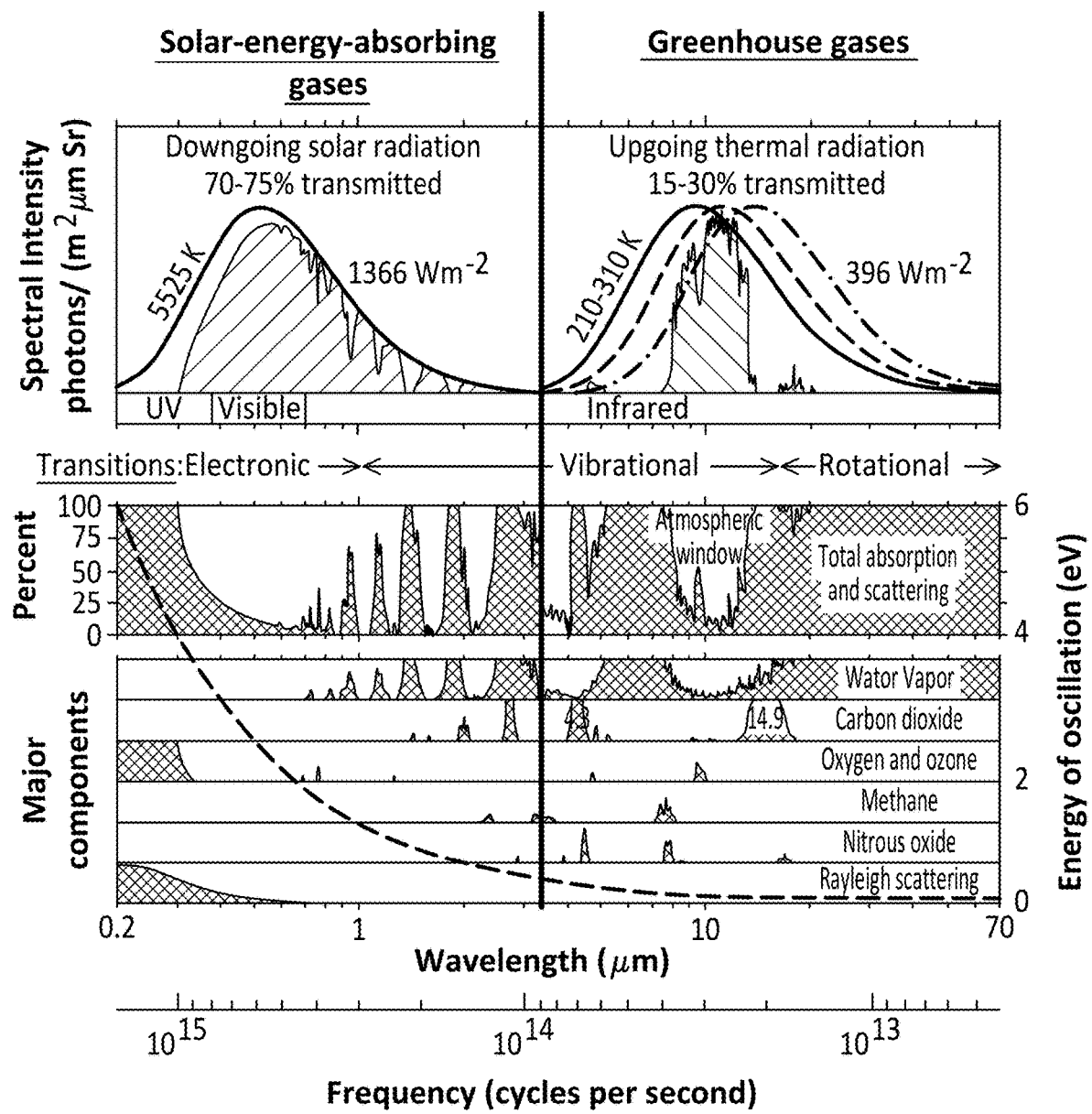
FIG. 2 is a schematic diagram illustrating shortwave and longwave solar radiation down-going to the earth's surface and up-going away from the earth's surface when the sky is clear (without cloud cover)

Referring next to FIG. 2, a spectral graph of shortwave and longwave (clear sky) radiation is shown. This spectral graph may be downloaded at: https://www.ncbi.nlm.nih-.gov/pms/articles/PMC6174548/. A primary goal is to influence the radiation energy budget experienced at the earth's surface. As can be seen, opportunities to moderate energy heavily depend on radiation wavelength. FIG. 2 can be broken into three major regions: (1) the magnitude and wavelength associated with down-going radiation from the sun to the earth—see top left portion of FIG. 2 (labelled Solar-energy-absorbing gases); (2) the magnitude and wavelength of up-going radiation from the earth that escapes the atmosphere—see top right portion of FIG. 2 (labelled Greenhouse gases); and (3) individual and cumulative attenuation of the atmospheric gases as a function of wavelength, which in turn, serve to block down-going and up-going radiation—see bottom portion of FIG. 2 (labelled Transitions—including the dotted line). Atmospheric "windows" are regions of the spectrum where radiation can pass through atmospheric gases (water vapor, carbon dioxide, methane, nitrous oxide) relatively unobstructed, thereby generating less atmospheric heat (less greenhouse effects). The two major windows are the shortwave window, which serves passage of sunlight to the earth, and the longwave window (10 to 14 microns), which provides the best passage for thermal longwave emissions. As shown in FIG. 2, carbon dioxide and other GHG in the atmosphere is offending in the longwave window.

It should be noted that the "clear sky" gaseous phenomena depicted in FIG. 2 become second order effects in the presence of cloud cover as manifested through the presence of water droplets or ice crystals. Cloud effects far outweigh gaseous effects for both incoming and outgoing radiation.

Figure 3:
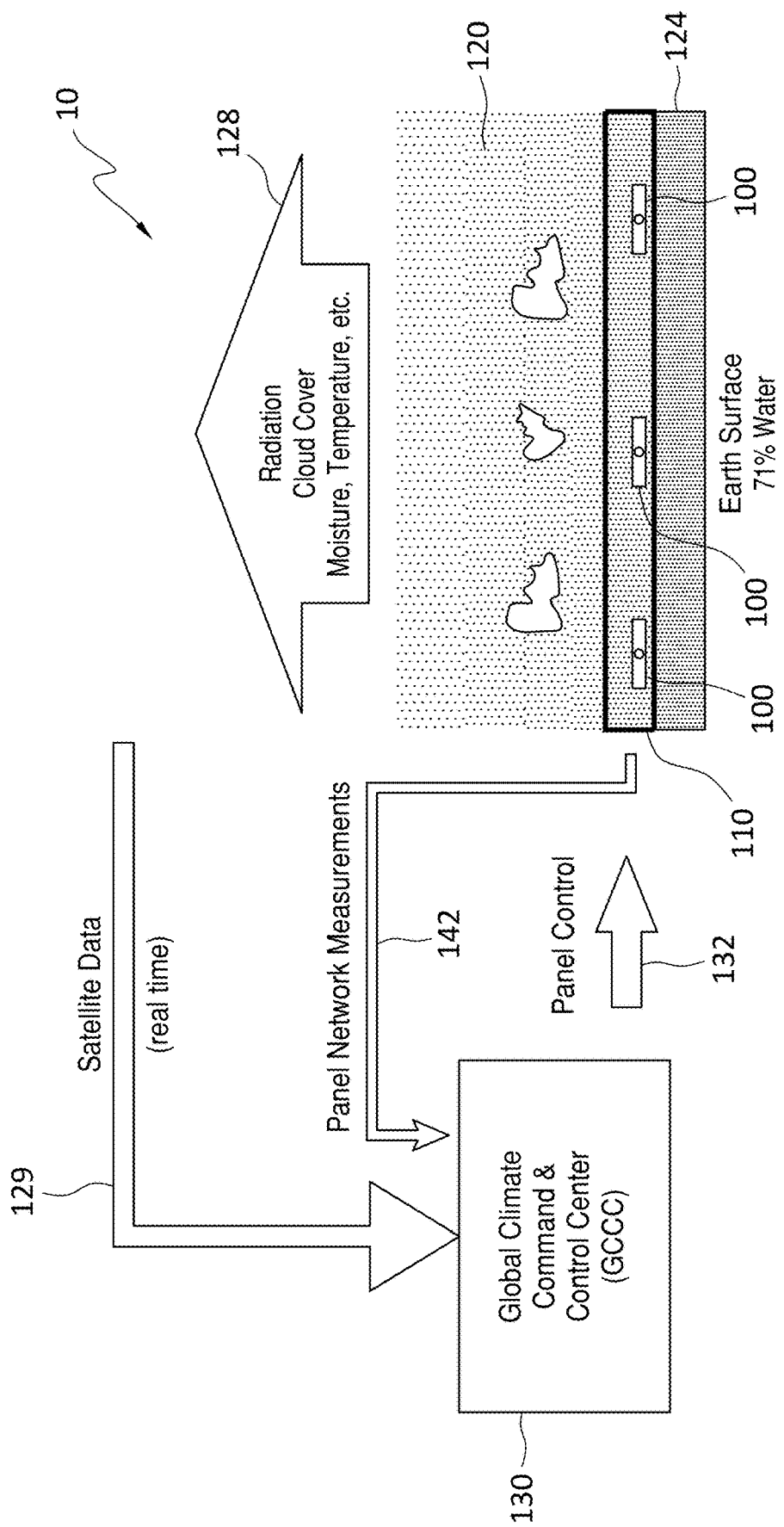
FIG. 3 is a schematic diagram illustrating a global climate control system according to the invention.

According to the invention, as shown in FIG. 3, a geo-engineering solution to control global climate 10 uses a distributed system of programmable forcings that are deployed at predetermined regions around the world. The programmable forcings are a series of panel units 110 that have rotatable panels 100 each with a radiation reflective surface 102 on one face and a radiation absorptive surface 104 on the opposite face. The panel units 110 are positioned at multiple locations on the earth's surface (including over land masses and over water masses). Orientation of the individual panels 100 within the panel units 110 will be controlled variously and dynamically to (i) reflect incoming solar radiation, (ii) absorb incoming solar radiation, and/or (iii) allow incoming solar radiation to bypass and reach the earth's surface. Using this system, the surface properties on the earth can be dynamically modified to cancel out the effects of the offending $CO_2$ or other GHG gas, and or potentially even to reset the global temperature to pre-industrial levels.

Desired orientation of individual panels 100 within a panel unit 110 in the global climate control system is determined based on several factors, including (i) the top of atmosphere measurements from satellite observatories 120, such as but not limited to Ceres and Modis; (ii) day or night conditions at the deployment location on the earth's surface 124 (which includes land masses and bodies of water); (iii) sea level; and (iv) weather conditions at the deployment location, including relative humidity and temperature as well as cloud cover 128. The top of atmosphere measurements and the other factors 129 shall be delivered to a central database and processor (or series of databases and processors) at a global climate command and control center 130 from which calculations will be made as to whether incoming solar radiation should be reflected or absorbed or in any way attenuated by the panels of specific panel units. Control signals 132 issued from the global climate command and control center shall control motors associated with the panel units 110 so that individual panels 100 may be rotated to a desired orientation.

A large number of satellite systems currently are in operation by NASA and NOAA which are meant to provide real-time feedback on the earth's radiation budget, including top of the atmosphere shortwave and longwave radiation. These systems also gather data on a variety of other critical factors, such as cloud cover, temperature, humidity and sea level, which among other functions are meant to serve the needs of the meteorology community. This data would also be shared with and used by the global climate command and control center 130 for the system according to the current invention. The highly sophisticated NASA and NOAA satellites, such as CERES and MODIS, along with their expert operational and data teams, are already in place and already collect regional and global data that will be necessary to operate the inventive system described herein. This data can be supplemented by local data collected by sensors 140 at or on the individual panel units 110, such as temperature, humidity, and insolation.

The global command and control center 130 provides remote control of the panels (forcings) 100 of the panel units 110 which make up the global panel network. The feedback information 142 is obtained from sensors 140 at or on the panel units 110 along with information obtained from the satellites 120. Although the distributed network of forcings will be complex, the advantages will be realized quickly. The global command center 130 may control the orientation of the individual panels 100 to impact climate variables, such as weather patterns, ocean current patterns, and the overall improvement in worldwide climate including attenuation of extreme weather conditions where possible. This control system 130 can provide high speed (seconds response, to allow control strategies that can optimize given climate objectives. Ultimately, the signal feedback, correlated, lends itself to acritical control.

I envision that there will be a global panel oversight committee to ensure that the global climate objectives are determined by consensus and appropriately monitored. Such committee also will ensure that the overall system is functioning in agreement with the member Nations which make up the committee. This board of governance can be seen as a great asset in building world unity by addressing an important problem that concerns all.

Figure 4:
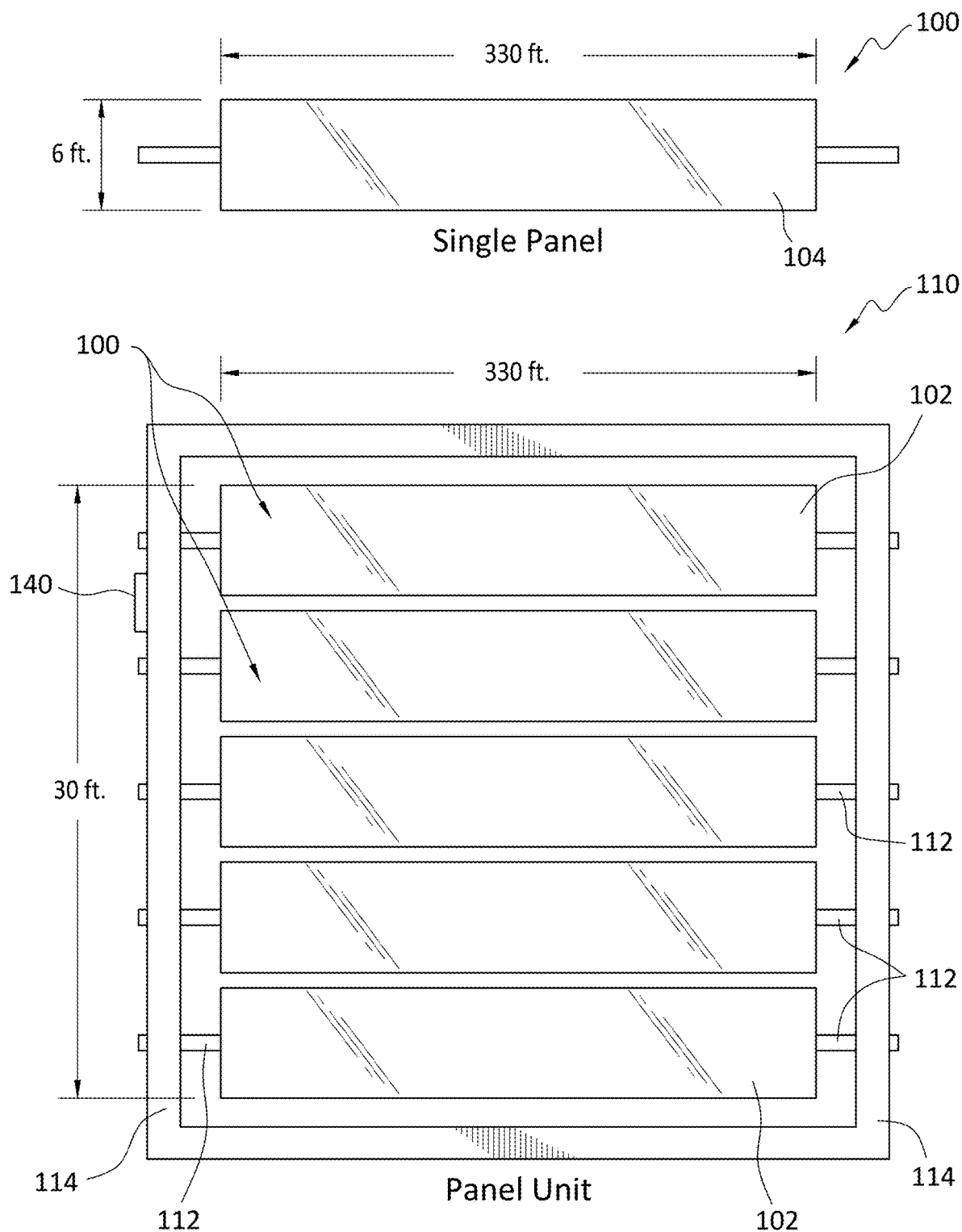
FIG. 4 is a schematic diagram illustrating a panel unit (base module) with panels, as well as a configuration for an individual panel.

As shown in FIG. 4, in one embodiment, the panel units 110 have a frame 114 that is mountable to a support or deployed over a ground surface or a surface of a body of water as desired for a specific deployment location. A series of panels 100 are configured for rotation within the panel unit 110. In the embodiment shown in FIG. 4, five panels 100 are disposed in a panel unit 110, with each panel 100 mounted to a respective shaft 112 that extends outside the frame 114 of the panel unit 110. In turn, the shafts 112 may be received in or joined to a motor or series of motors to control rotation thereof. In the embodiment shown in FIG. 4, the panel unit (base module) 110 has a width of from 20 feet to 60 feet (6.1 m to 18.3 m), with a width of 30 feet (9.1 m) shown in FIG. 4. In this embodiment, an individual panel 100 held within a panel unit 110 has a width of 4 to 6 feet (1.2 m to 1.8 m), with a width of 6 feet (1.2 m) shown in FIG. 4. Such individual panel 100 has a length of from 250 feet to 400 feet (76.2 m to 122 m), with a length of 330 feet (100.6 m) shown in FIG. 4. The combined grouping (panel unit 110 or base module with five panels 100) has a footprint of 330 feet by 330 feet (100.6 m by 100.6 m) in the embodiment shown in FIG. 4. These dimensions are exemplary, and it is within the scope of the invention for other dimensions for panels and panel units to be used as desired when the panel units are deployed over specific ground surfaces or bodies of water.

The panels 100 provide the key optical properties for both positive and negative forcings. Each panel 100 has a radiation reflecting surface 102 and a radiation emissive surface 104 opposite the radiation reflecting surface 102. The radiation reflecting surface 102 is highly reflective to shortwave and longwave solar radiation, preferably 95% reflective. The radiation emissive surface 104 ideally is a black body radiator.

In one embodiment, the panels 100 are formed of aluminum, and the reflecting or reflective surface 102 is aluminum, and the emissive or absorbing surface 104 is painted with a black body coating. Such black body coatings include soot, carbon black, platinum black and carborundum. These coatings have emissivities at 95% or greater over the full black body spectrum at a given temperature. Emissivity black paints are available from Acktar—https://www.acktar.com/products-services/high-emissivity-materials/. The paints can be applied at thicknesses of at least about 5 microns to obtain desired emissivity.

In another embodiment, the panels 100 are formed of composite materials and a polymeric film with reflective material or reflective particles entrained therein is applied to the radiation reflecting or reflective surface 102, and a polymeric film with radiation absorptive particles entrained therein is applied to the radiation emissive or absorbing surface 104. Alternatively, the radiation reflecting or reflective surface 102 may be painted with an aluminum containing paint or may be coated with an aluminum coating.

In another embodiment aluminized film is applied to the panel surface 102 that is reflective. Aluminized films are sturdy, robust, weather-proof and cost effective. Other metal films containing gold or silver also may be considered. Aluminum, gold and silver can form mirrored surfaces that reflect both shortwave and longwave radiation. Alternatively, the reflective surface 102 may be formed with a "radiative cooling" material having reflectivity of greater than 95% in the shortwave region, some of which are designed to have IR emissivity in the longwave window. Radiative cooling materials provide ideal performance for daylight use. As yet another alternative, dielectric mirrors of highly specialized polymer layers can be created to tailor spectral properties when used for the reflective surface 102.

Moreover, the radiation reflective surface may comprise or have an applied film, such as a new class of materials referred to as radiative cooling films have spectral radiation properties that reflect visible, short wave radiation and emit infrared, long wave radiation. Radiative cooling films currently are used to improve cooling building roofs.

Specialized emissive surface materials that are designed to enhance nighttime thermal radiation are available. Specialized emissive surface materials can be designed to promote the magnitude and frequency of longwave radiation emissions through the longwave window, thereby improving the cooling effects associated with increased top of atmosphere energy emissions. Examples of emissive surface materials include carbon black coatings, Martin Black paint, black Tedlar, black polyethylene, and advanced emissive coatings that employ nanotube technology. Surface roughness also improves emissions and convection to surrounding air.

Figure 5A:
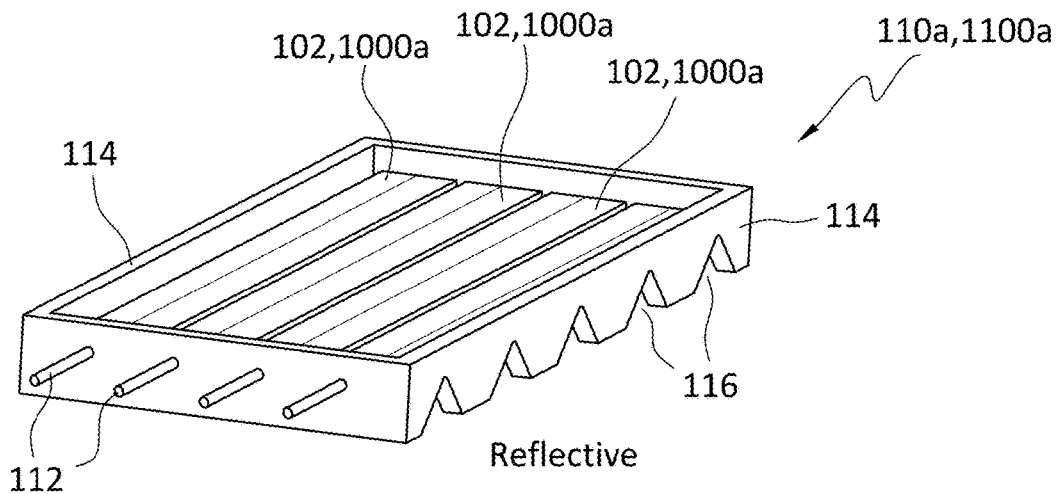
FIG. 5A a is a right front perspective view of the panel unit deployed in reflective orientation.
Figure 5B:
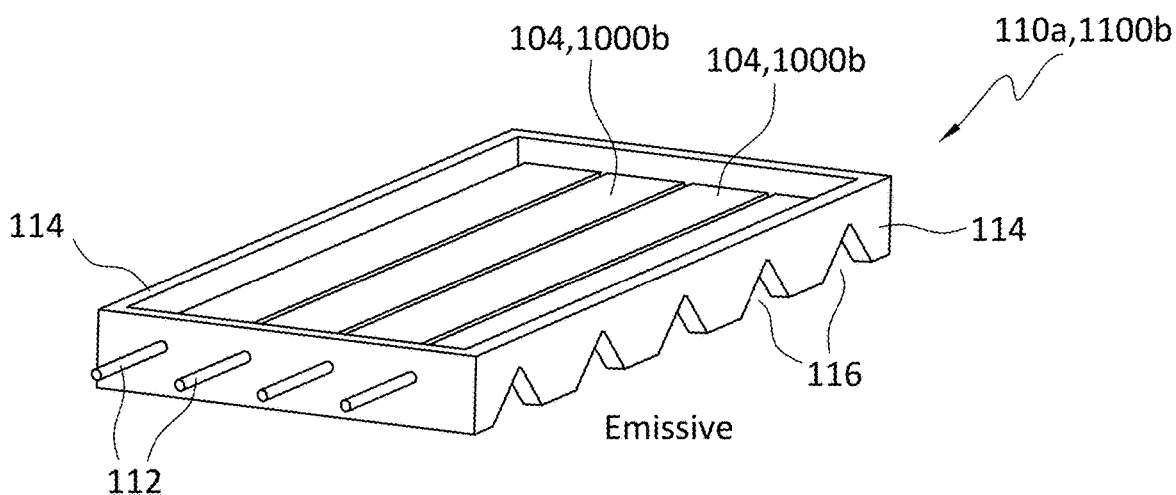
FIG. 5B is a right front perspective view of the panel unit deployed in emissive orientation.
Figure 5C:
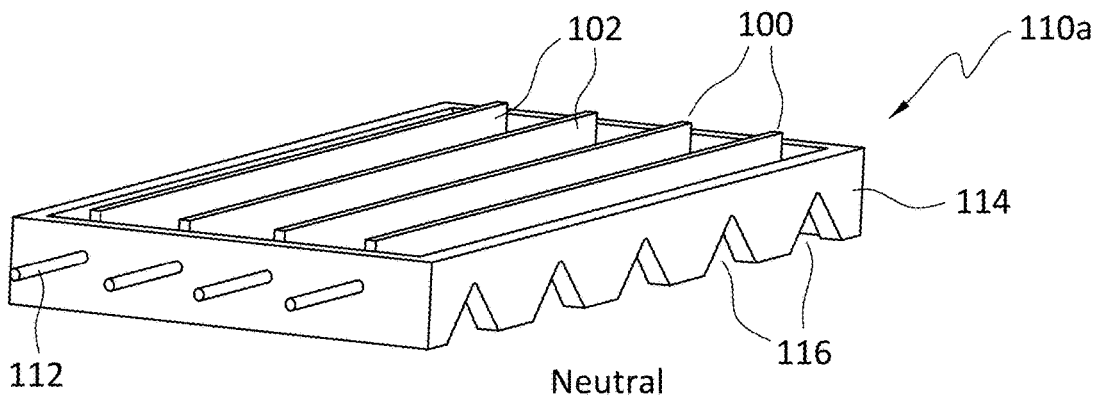
FIG. 5C is a right front perspective view of the panel unit deployed in neutral orientation.

The panels 100 have three cardinal positions as shown in FIGS. 5A, 5B and 5C. In FIG. 5A, the exemplary panel unit 110a has four panels 100 and is shown with the panels 100 in reflective orientation. The reflective surfaces 102 of the panels 100 are directed upwardly, reflecting all or most incoming downwelling shortwave and longwave solar radiation. By so reflecting incoming downwelling shortwave and longwave solar radiation, a good portion of the reflective radiation will escape the top of the atmosphere, reducing the radiation within the earth's atmosphere. In FIG. 5B, the exemplary panel unit 110 has four panels 100 and is shown with the panels 100 in emissive orientation. The emissive or absorbing surfaces 104 of the panels 100 are directed upwardly, absorbing incoming shortwave and longwave solar radiation. Incoming downwelling solar radiation is absorbed by the panel surface 104, and upwelling radiation is emitted from the panel surface 104. In FIG. 5C, the exemplary panel unit 110 has four panels 100 and is shown with the panels 100 in neutral orientation. The panels 100 are rotated by 90 degrees, such that incoming solar radiation will pass through the frame 114 and past the panels 100 to reach the earth's surface.

In a preferred embodiment, the panels 100 may be positioned at desired orientations other than the three cardinal positions. In this manner, when the panels 100 are rotated to angular orientations between the cardinal positions, a greater or lesser amount of downwelling shortwave and longwave radiation may be reflected by the panels 100.

The frame 114 of the panel unit defines air passageways 116 to allow air to flow beneath the panels 100 of the panel unit 110. The air in the surrounding region thus can move in and around the panel frames 114. Heat flux will move horizontally between the panels 100 and adjacent regions. Moreover, the panels 100 may be rotated intermittently to cause air exchange between the subtended region under the panel unit 110 and the surrounding air.

Figure 6:
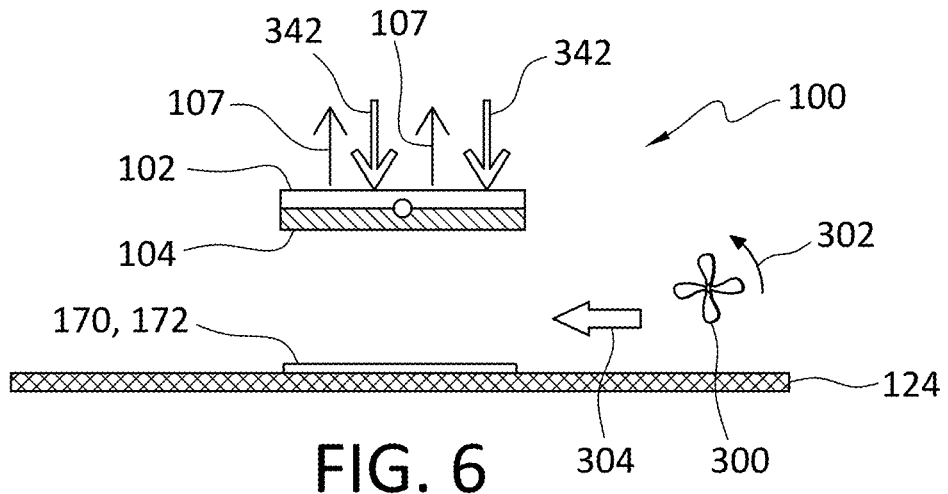
FIG. 6 is a schematic diagram modelling a climate control system according to the invention in a daytime use configuration with panels oriented for daytime incoming shortwave direct radiation.

Referring next to FIG. 6, a panel unit 110 is shown mounted approximately 1.2 meters above the earth's surface 124. The panel units 110 are of a width that permits panel rotation without panel 100 edges thereof contacting a ground surface or water surface above which the panel unit 110 has been installed. The panels 100 can have predetermined lengths as desired. Depending upon the composition of the panel unit 110, lengths of 100 feet (30.5 m) to over 500 feet (152.4 m) are possible, with a representative panel 100 having a length of 330 feet (100.6 m). Optimum panel unit 110 placement will position the rotatable panels 100 from about 1 meter to about 3 meters above the earth's surface 124. With such panel placement, the width of the panels 100 desirably can be from about 1 to about 2.8 meters, or alternatively from about 4 feet to about 6 feet (about 1.2 m to about 1.8 m). Thus, panel surface areas from 600 square feet (55.8 m$^2$) to approximately 3000 square feet (278.8 m$^2$) are envisioned.

When the panel unit 110 is deployed in the reflective orientation with each panel 100 having its radiation reflective surface 102 facing upwardly as is shown in FIG. 6, the downwelling daytime shortwave direct radiation 342 is reflected by the panel 100 as denoted by arrows 107 and the subtended region 170 below the panel unit 110 is cooled because the subtended region 170 below the panel unit 110 is shaded 172 from the downwelling radiation 342. The cooling effects of the subtended region 170 are distributed horizontally and vertically through advection and convection of air. A unique feature is that both longwave and shortwave radiation is reflected by the panels 100 of the panel units 110. The average global cooling effects achieved by the system 10 of the invention are expected to be a function of the magnitude of the differential surface properties at various wavelengths (shortwave and longwave), the location of the panel units (latitude and longitude) on the earth's surface, and the percentage of the earth's surface that is covered by panel units.

Mechanisms to rotate the shafts 112 include, but are not limited to, (a) a combination of linkages to stepper motors (brushless DC motors) with associated indexers (controllers) and drivers (amplifiers); and (b) torque motors (permanent-magnet synchronous rotary motors) with associated controllers and drivers. (See, e.g., motor 150 in FIG. 19). The motor controls adjustment of the angular position of the panels based on angular position feedback of a mechanically linked encode. The shafts 112 are capable of being rotated by motors 150 so that the panels 100 may be positioned and held in at least each of the configurations such as those shown in FIGS. 5A-5C. Preferably, the shafts 112 may be rotated to position the panels 100 in a panel unit 110 in any desired angular orientation, which desired angular orientation may be maintained until the command center applicable to the panel unit 110 transmits alternative position commands.

When the shafts 112 are not directly acted on by the selected motor(s), linkages between the shafts 112 and the selected motor(s) may be provided. Linkages include gearboxes as well as pivot arms, crank arms or rocker arches (see, e.g., U.S. Pat. No. 9,453,899 of Exosun).

Figure 7:
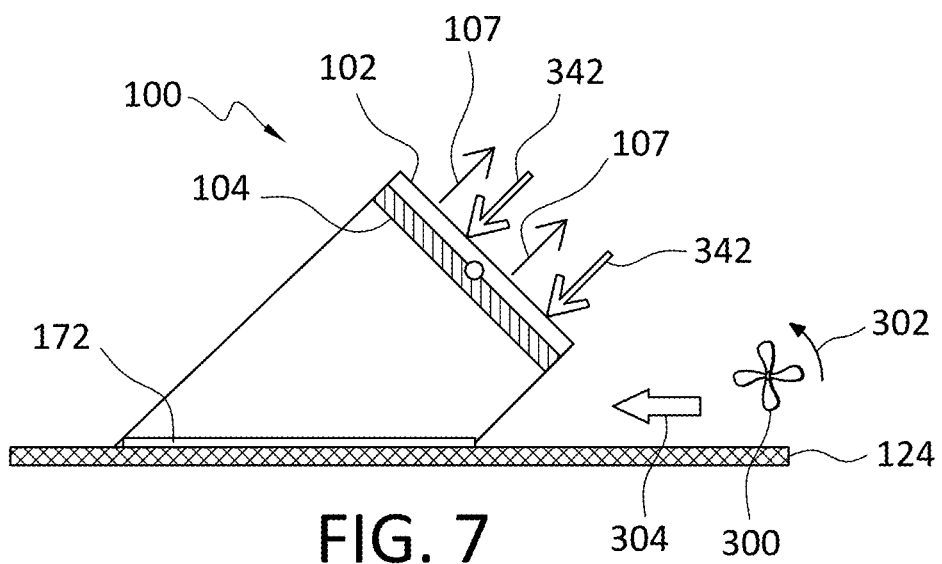
FIG. 7 is a schematic diagram modelling a climate control system according to the invention in a daytime use configuration with panels oriented for daytime incoming shortwave direct radiation using solar tracking (direct normal)
Figure 8:
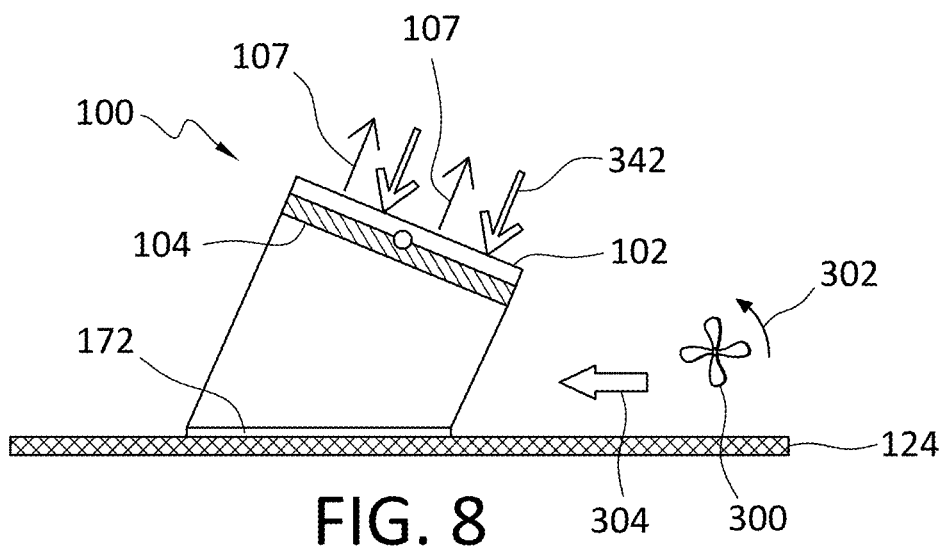
FIG. 8 is a schematic diagram modelling a climate control system according to the invention in a daytime use configuration with panels oriented for daytime incoming shortwave direct radiation using solar tracking (direct normal with vertical reflection)

Solar tracking may be used to orient the panels 100 of the panel units 110 for direct normal reflective configuration to reflect the downwelling daytime shortwave direct radiation 342 in the daytime on clear days. As shown in FIG. 7, when using solar tracking to orient the panels 100, the reflected radiation 107 may be reflected in a direction normal to (perpendicular to) the reflective surface 102 of the panel 100. Alternatively, as shown in FIG. 8, when using solar tracking to orient the panels 100, the reflected radiation 107 may be reflected in a direction at an angle to the reflective surface 102 of the panel 100.

In the case of direct normal incoming solar radiation, the maximum shading below the panel units 110 occurs with the panel orientation perpendicular to the direct normal radiation (Sec FIG. 6). The angular orientation of the panels 100 can be optimized for a vertical reflection to give maximum top of atmosphere cooling versus a maximum shading effect on the earth's surface below the panel unit 110.

When the incoming solar radiation is more diffuse, e.g., not direct, the panel units 110 may be deployed as shown in FIG. 6, with the panels 100 oriented with their reflective surfaces 102 directed upwardly toward the sun. At a given time during the day, there will be a mix of direct normal and diffuse downwelling shortwave radiation. The angle of the panels 100 may be optimized by the control system. As one example, on a very cloudy day where 99 percent of the downwelling radiation is diffuse, the optimum panel angle will be horizontal (such as shown in FIG. 6).

Figure 9:
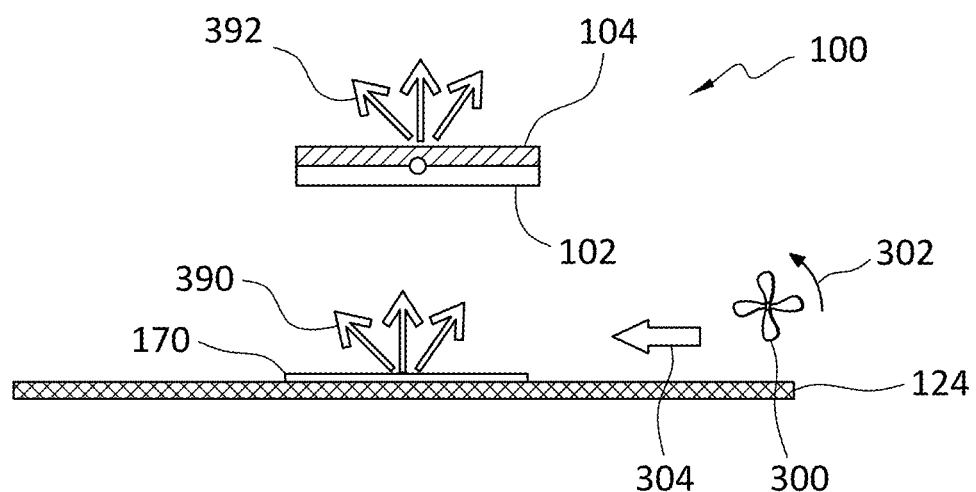
FIG. 9 is a schematic diagram modelling a climate control system according to the invention in a nighttime use configuration with panels oriented for nighttime blockage of radiation emission from the earth's surface.

FIG. 9 shows a panel unit in a proposed orientation during nighttime. The panels 100 have the radiation absorptive surfaces 104 directed upwardly toward the top of the atmosphere. The radiation absorptive surfaces 104 (blackbody) will emit radiation (heat) 392 as a function of temperature, which is influenced primarily by the surrounding air, according to Planck's Law. The earth's surface 124 will emit radiation (heat) 390 as a function of skin temperature and the corresponding spectral emissivity of the terrain. The effects of the two surfaces are additive, such that the panel units 110 enhance nighttime cooling at the earth's surface. Moreover, the panels 100 block radiation emission from the terrain as a function of the aspect ratio of the height of the panels versus their surface area dimensions. And, the radiation reflective material on the radiation reflective side 102 of the panels 100 reflects IR radiation 390 to maximize the amount of radiation that may escape and cool the earth's surface 124.

One or more fans 300 may be installed within the panel unit 110 or near the panel unit 110 so as to direct air under the panels 100 in the direction of arrow 304. Rotation 302 of each fan 300 optionally may be controlled by the programmable controller. Such air flow 304 cools the region under the panels 100, and also may cool motors or other components or structures of the radiation/energy absorption moderating system.

FIGS. 19-23 show another alternative panel unit 610 according to the invention comprised of at least two panels 600 (see FIG. 23), and preferably four or more panels to comprise a panel unit. As shown in FIGS. 19-23, the panels 600 have a reflective surface 602, and an emissive surface 604 opposite the reflective surface 602. The radiation reflecting surface 602 is highly reflective to shortwave and longwave solar radiation, preferably 95% reflective. The radiation emissive surface 604 ideally is a black body radiator. The material compositions of the panels 600 may be the same as the material compositions described herein with respect to the panels 100.

The panels 600 are joined to or integrally formed with a shaft 612. The ends of the shaft 612 extend beyond the side edges of the panel 600. Each panel 600 is supported for rotation above a ground or water surface. The panels 600 shield or block the earth from solar radiation, while at the same time, the elevated position of each panel 600 allows the earth's skin surface to emit radiation upwardly. In contrast, if the panels 600 were not elevated from the ground surface or other support surface, the panels 600 would block normal shortwave and long wave radiation surface emissions. One optimal panel height installation range is from 1 to 3 meters, preferably from 1.5 to 2 meters.

A pair of support posts 620, 620' is spaced apart a distance to accommodate the length of a panel 600. Bearings 622, 622' associated with the support posts 620, 622' accommodate the shaft 612, so that the shaft 612 is rotatable with respect to the support posts 620, 620'. One end of the shaft 612 is connected for rotation to a motor 150, such as but not limited to a stepper motor. Multiple pairs of posts may be installed to support multiple panels to create a panel unit 610. One or more sensors 640, such as temperature and humidity sensors, may be installed on the respective support posts 620. Preferably, the sensors 640 transmit data to the programmable controller associated with the panel unit 610.

Figure 19:
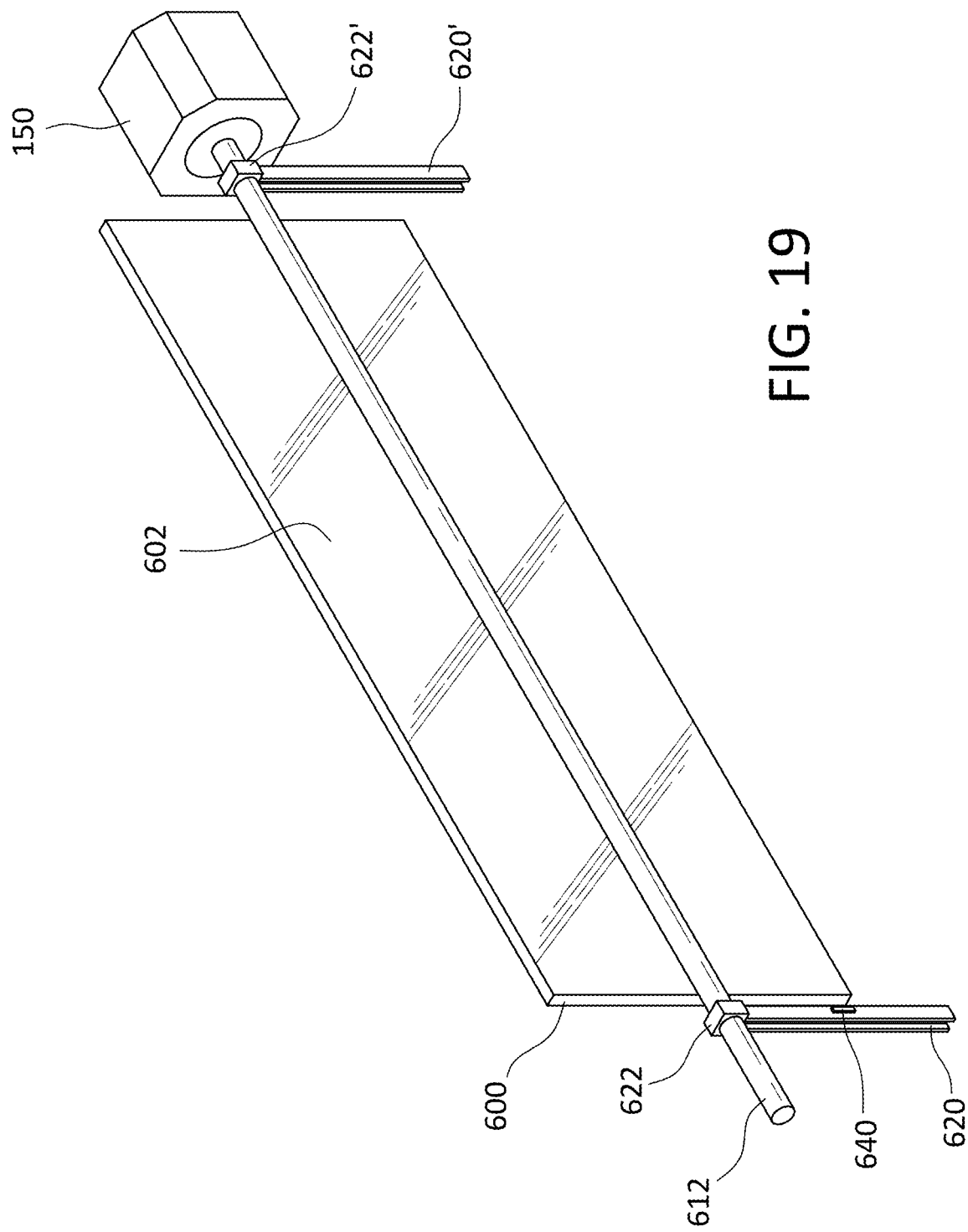
FIG. 19 is a right front perspective view of a panel in a neutral orientation, with said panel mounted on a shaft that is supported by bearings within support posts.
Figure 20:
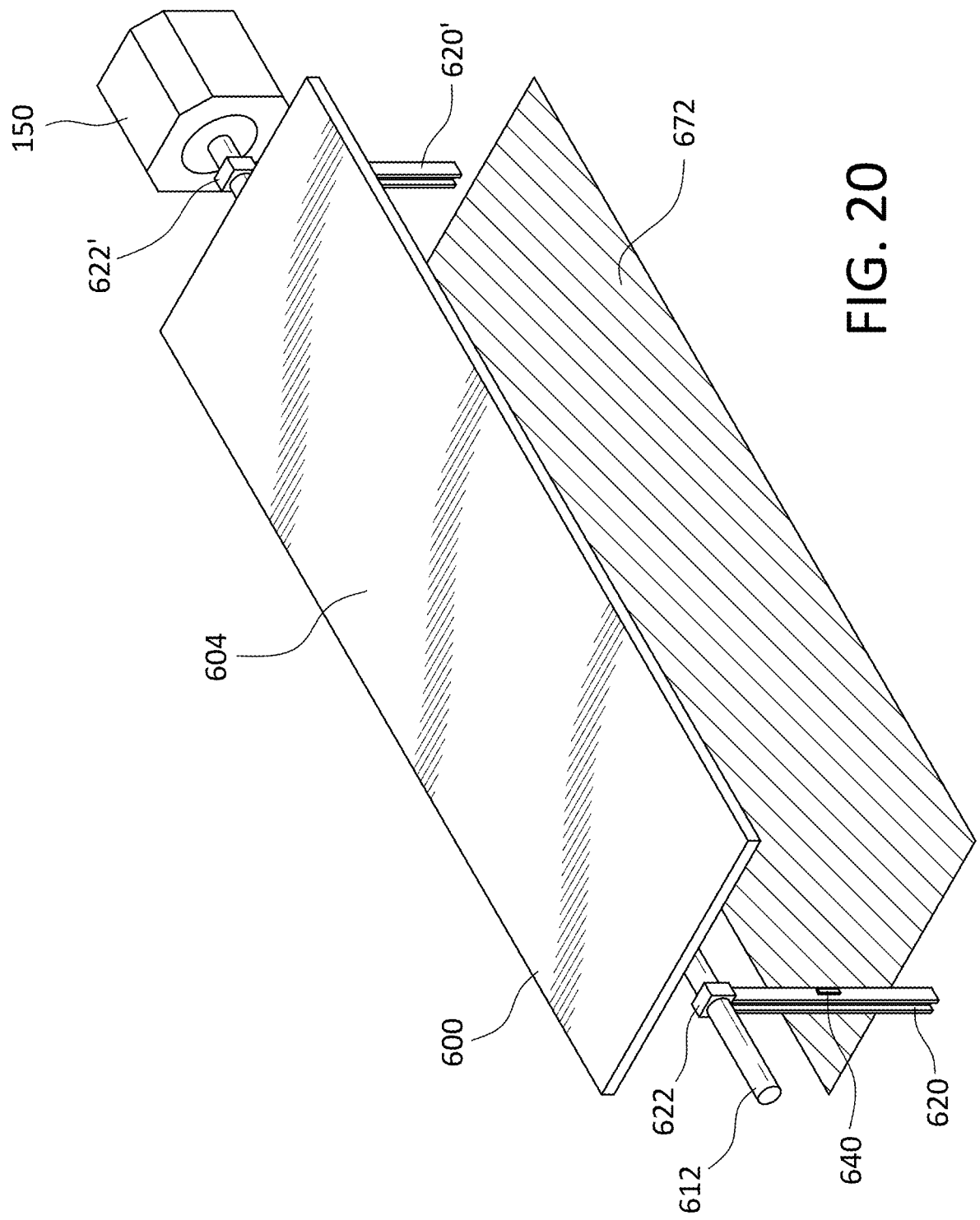
FIG. 20 is a right front perspective view of the panel of FIG. 19 in an emissive orientation.
Figure 21:
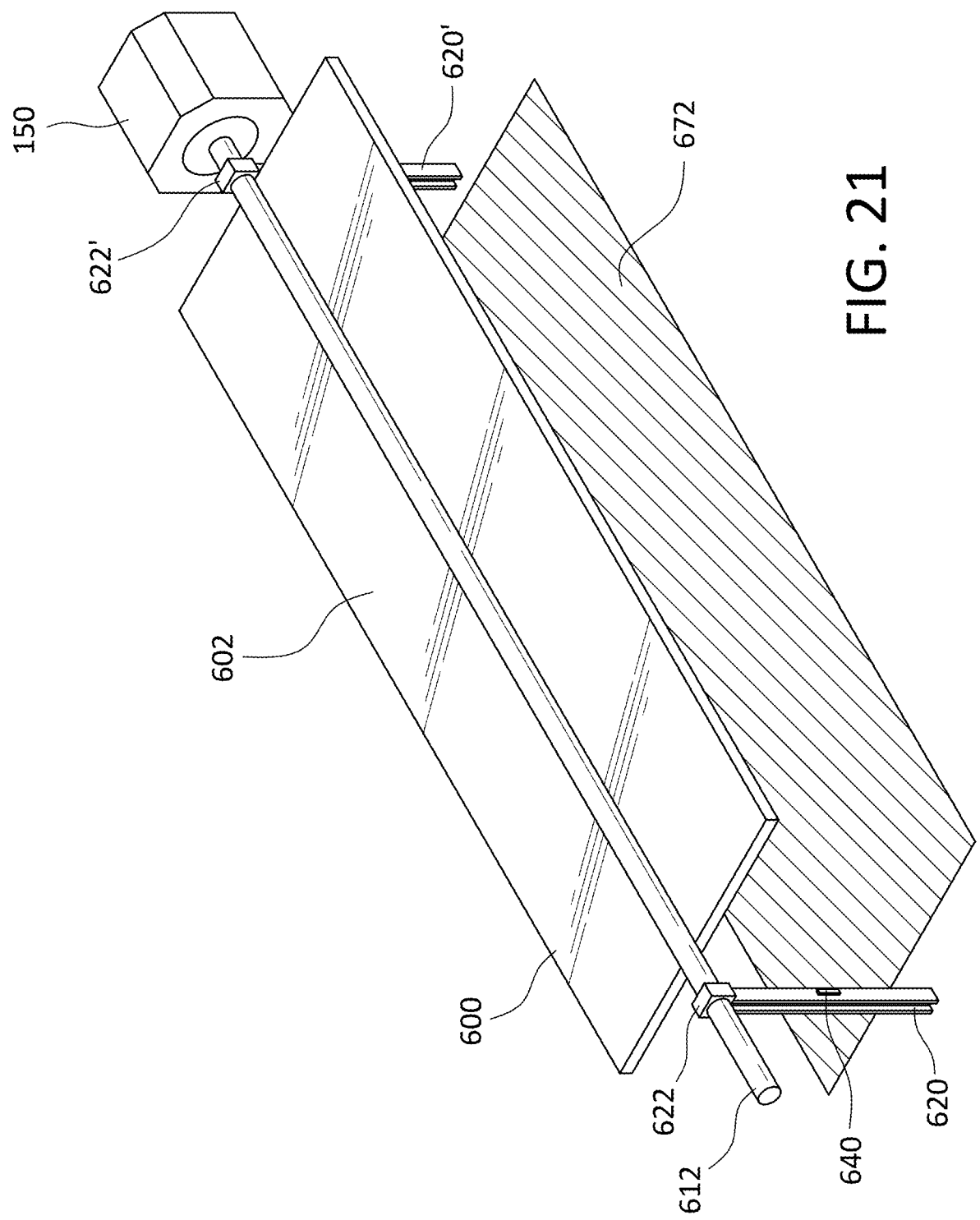
FIG. 21 is a right front perspective view of the panel of FIG. 19 in a reflective orientation.

FIG. 19 shows a panel 600 in the neutral orientation, allowing a maximum amount of the sun's radiation to impact upon the ground surface below the panel 600, shading only a very small area under the panel 600. By contrast, as shown in FIGS. 20 and 21, a substantial shaded region 672 is present below the panel 600 when the panel 600 is in the emissive or radiation absorbing orientation of FIG. 20, as well as when the panel 600 is in the reflective orientation as shown in FIG. 21. The programmable controller transmits commands to the motors 150 so as to rotate the shafts 612 of the panels 600 to specific angular orientations to reflect or absorb incoming radiation as desired.

Figure 22:
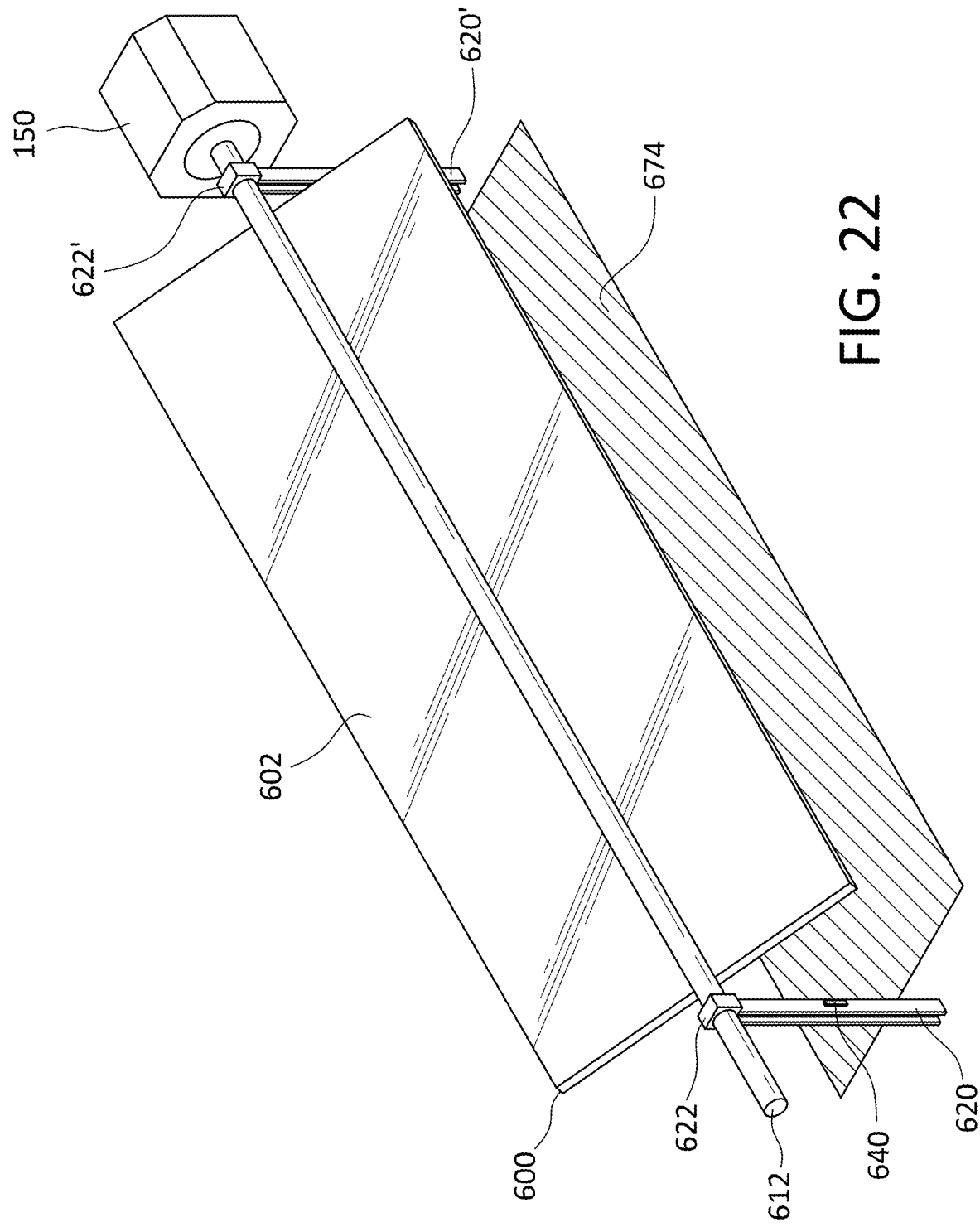
FIG. 22 is a right front perspective view of the panel of FIG. 19 in a partially reflecting orientation.
Figure 23:
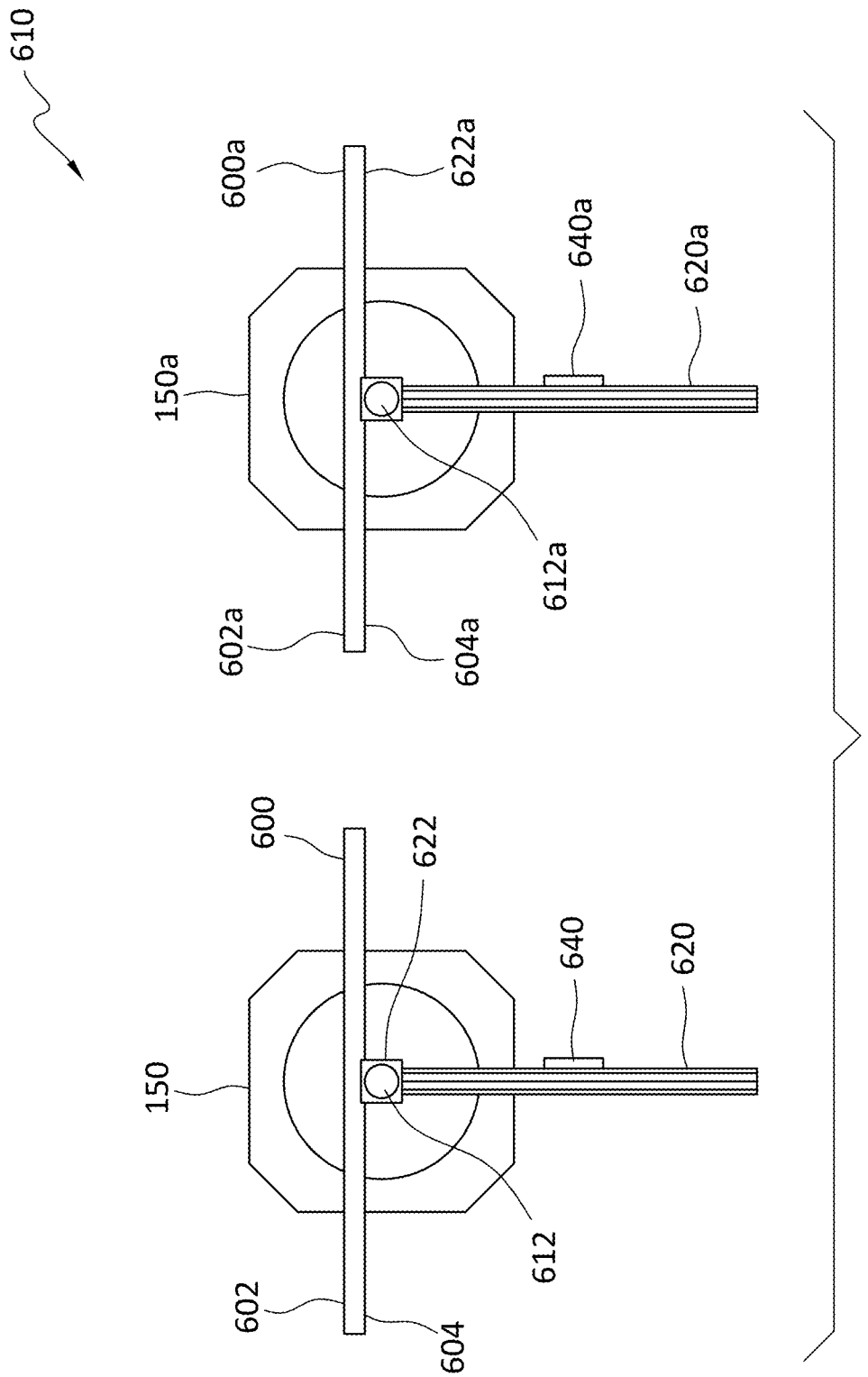
FIG. 23 is a right side elevational view of the panel of FIG. 19 and the right side elevational view of a second panel adjacent thereto, the two panels together forming a panel unit.

Intermediate orientations between neutral, emissive and reflective are contemplated, such as one intermediate orientation shown in FIG. 22. In such intermediate orientation, a shaded region 674 of a different size smaller than the shaded region 672 is formed below the panel 600. Regardless of whether the panels 600 are in the neutral, emissive or reflective orientations, the ground region below the panels 600 radiates long wave radiation and the panels remain thermally coupled to the surrounding air. Kinetically speaking, each panel 600 is isolated from the ground, but is indirectly coupled through the air. The panels 600 set up a double deck cooling, where the subtended region 672, 674 is a first deck and the emissive surface 604 of the panel 600 is a second deck. The extra upwelling radiation emission of the panel 600 functions in accordance with the Stefan-Boltzmann law, which ties such emission directly to the surface temperature of the panel 600. At night, the emissive surface 604 of the panel 600 will cool more quickly than the surrounding air. Heat will be transferred from the air to the black body emissive surface 604 and in turn shall be radiated upwardly.

Figure 10:
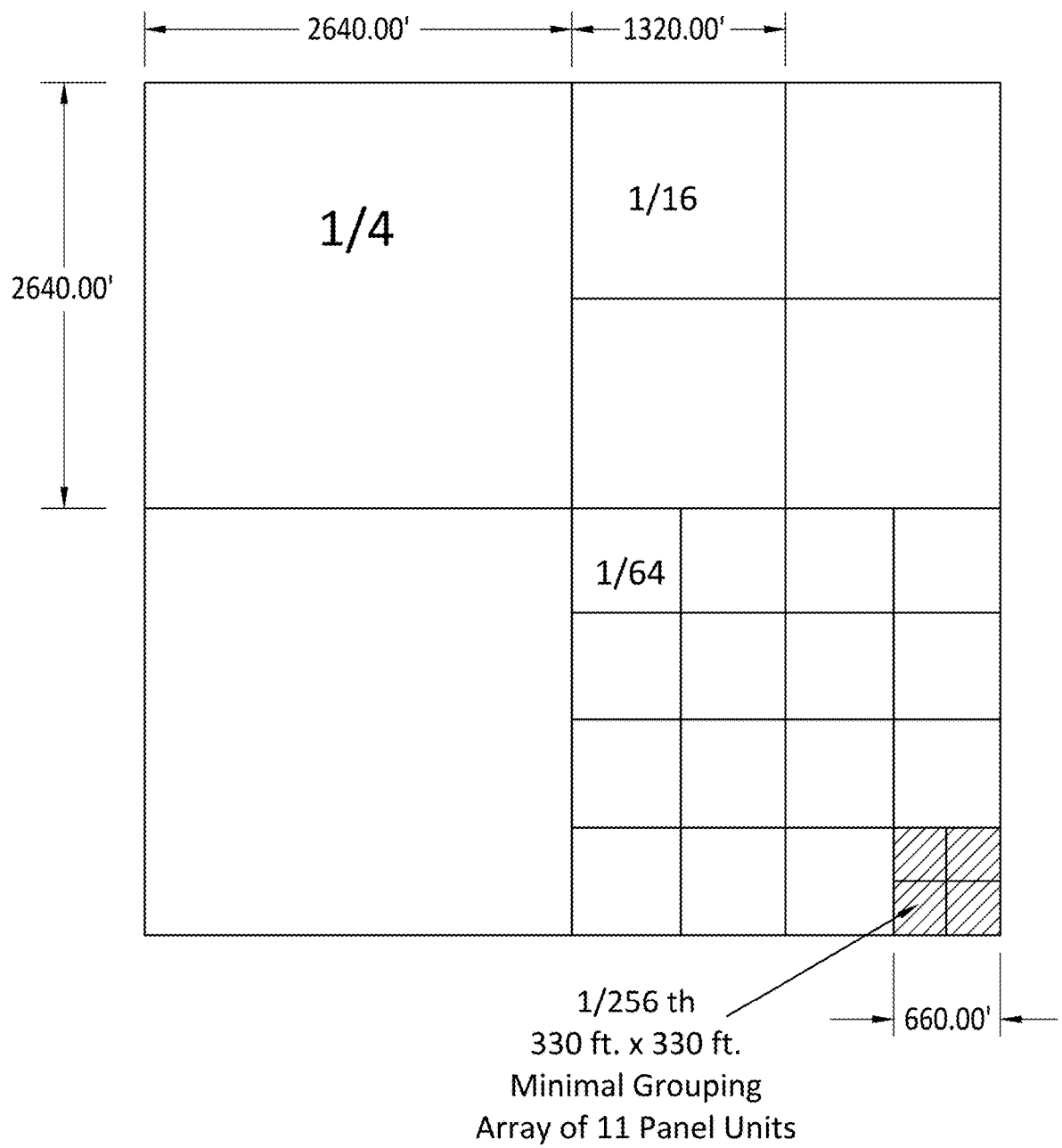
FIG. 10 is a schematic diagram illustrating a representative grouping of panel units over a portion of a square mile area.

A series of panel units 110, 610 may be installed to form a panel farm at a given location. One example of a possible panel unit 110 distribution or tiling is shown in FIG. 10. An array of 11 panel units (base modules) 110 sized as proposed in the current application could be installed over a $\frac{1}{128}$ fraction of a square mile (or $\frac{1}{128}$ fraction of a $km^2$).

Panel units 110, 610 should be deployed in sufficient quantities and in a highly distributive fashion over the earth's surface to create a distributive forcing of radiation out of the top of the atmosphere. A minimum improvement in energy budget to compensate for carbon dioxide ($CO_2$) emissions is considered to be 0.031 $W/m^2$ per year. The average global cooling effects produced by the system 10 are a function of the magnitude of differential surface properties at various radiation wavelengths (shortwave and longwave radiation), the locations on the earth (latitude and longitude) where the panel units 110, 610 are deployed, and the percentage of the earth's surface that is covered by panel units 110, 610. A preliminary benchmark is to have panel units 110, 610 cover at least 1,000,000 square miles (2,590,000 $km^2$) of earth surface (both land masses and water masses). This is approximately 0.5% of the earth's surface. With the panels 100, 600 in the reflective orientation, the panel units 110, 610 shade the subtended surface region 170, 672 blocking absorption of energy at the earth's surface 124. Under this benchmark of 0.5% of the earth's surface, the reduction in absorbed energy will be significant: (0.5%)(168 $W/m^2$)=0.84 $W/m^2$ reduction in absorbed energy. With the invention, the average improvement in shortwave radiation is anticipated to be 0.60 $W/m^2$, and the average improvement in longwave radiation is anticipated to be 0.40 $W/m^2$. The average improvement in heat shield by shading is anticipated to be 0.80 $W/m^2$. Together, the total average improvement yielded is anticipated to be 1.8 $W/m^2$. This can vary according to latitudinal and longitudinal placements, as well as optimization of panel unit controls.

Figure 11:
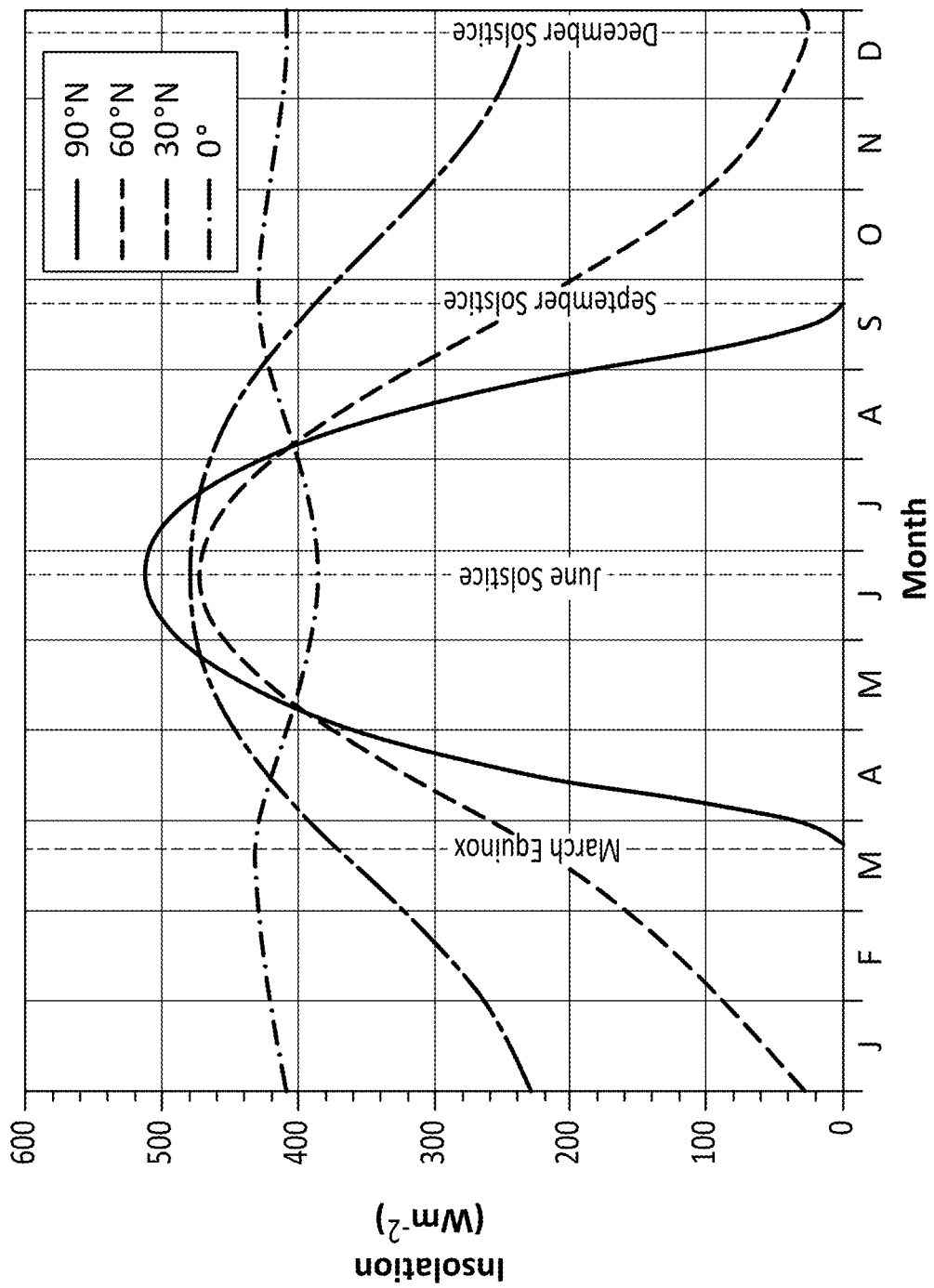
FIG. 11 is a graph of the incoming solar radiation by calendar month at different latitudes of the earth.

Installing the panel units 110, 610 primarily in mid-latitude regions at or near the earth's equator has the greatest potential to reduce global warming. This is because the mid-latitude regions experience the highest incoming solar radiation throughout the year. FIG. 11 shows the insolation at the earth's surface (i.e., incoming shortwave radiation) dependent upon distance from the equator as a function of calendar month. This data may be downloaded at http://www.physicalgeography.net/fundamentals/6i.html.

Figure 12:
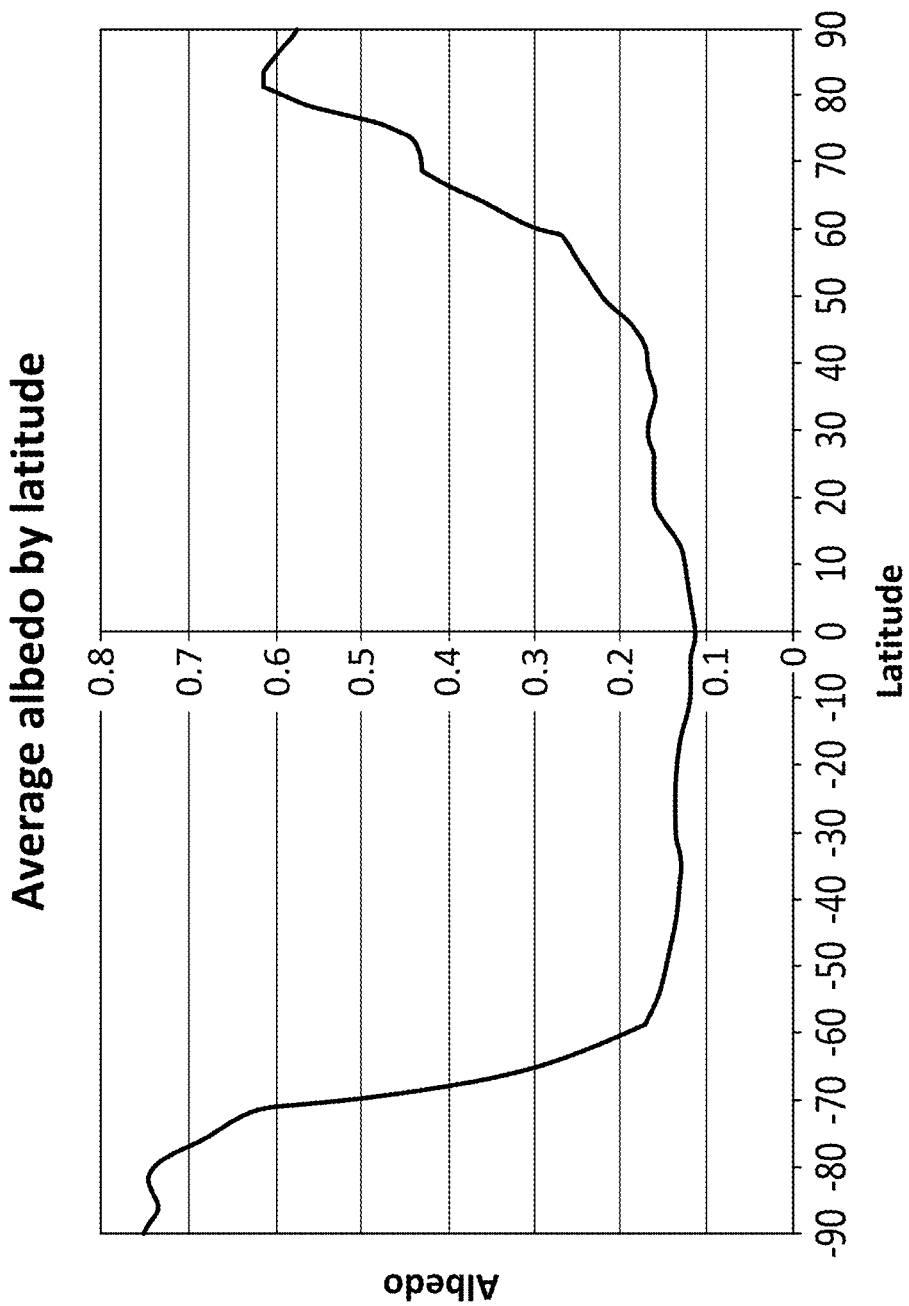
FIG. 12 is a graph of earth's planetary ALBEDO (%) as a function of latitude.

FIG. 12 shows the total shortwave radiation reflectivity experienced by the earth as a function of latitude. This data may be downloaded at http://www.climatedata.info/forcing/albedo/.

Figure 13:
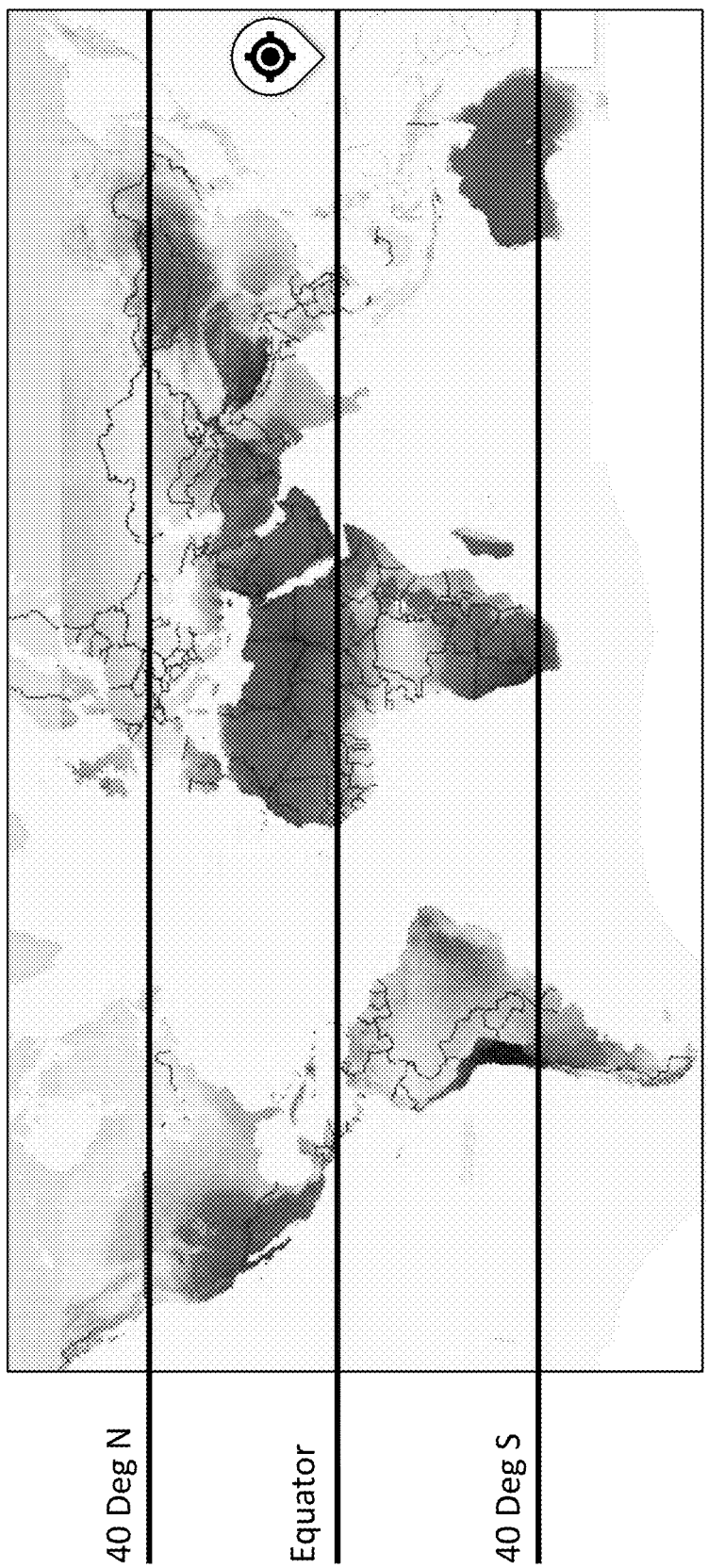
FIG. 13 is a schematic diagram illustrating mid-latitude regions that are optimum for placing panel units according to the invention.

FIG. 13 identifies the optimum mid-latitude regions for placement of the panel units 110, 610 of the climate control system 10 according to the invention. As shown, the optimum mid-latitude regions are from 40 degrees north of the equator (40° N) to 40 degrees south of the equator (40° S), or more preferably from 20 degrees north of the equator (20° N) to 20 degrees south of the equator (20° S). These regions experience the highest insolation, such that reflecting away more radiation will have the highest benefit to reducing the earth's temperature. Thus initial distribution of panel units can be chosen for maximum efficacy for surface cooling.

The climate control system 10 according to the invention is intended to be distributed to populous areas first, because these areas are expected to offer easier installation and maintenance, while remaining unobtrusive to daily life. Panel unit distribution can include placement in small villages, which are estimated to be 1.2 billion worldwide (with 600,000 million in India alone). A given village may participate with a small surface area region (e.g., 0.25 square miles (0.65 $km^2$)). In combination placement in small villages has potential to yield high cumulative coverage with readily available support from residents of those villages. For larger towns or cities, panel units may be installed in increments of 1 square mile (2.59 $km^2$) or greater, while still remaining unobtrusive to residents. Again, when panels are installed in populated regions, there is potential to yield high cumulative coverage with readily available support from residents.

The surface mounted panel units 110, 610 with rotatable panels 100, 600 according to the invention have key optical surface properties that redirect (reflect) down-going radiation upwards through the shortwave window (see FIG. 2). Alternately, the rotatable panels 100, 600 may be positioned to improve the emission of longwave radiation that can escape through the longwave window. For example, the panels 100, 600 may be set to the emissive position at night (See FIGS. 9 and 20). Both effects, reflective and emissive, shall have a net cooling effect on the earth's surface.

The inventive system 10 offers programmable forcings that can be deployed and distributed worldwide to provide safe and effective reversal of global warming on a real time basis, notwithstanding rising levels of GHG emissions into the earth's atmosphere. Panel units 110, 610 can be deployed and then programmed and activated as needed. Effects can be remotely tuned and even reversed. This includes real-time programming for day/night settings, also taking into account other variables, such as but not limited to cloud cover, circulation patterns, and temperature. The estimated costs to deploy this inventive dynamic system to moderate energy absorption worldwide will be much less than the estimated costs for reducing carbon dioxide or other green house gas emissions and the estimated costs of adverse impacts of continued global warming.

Figure 14:
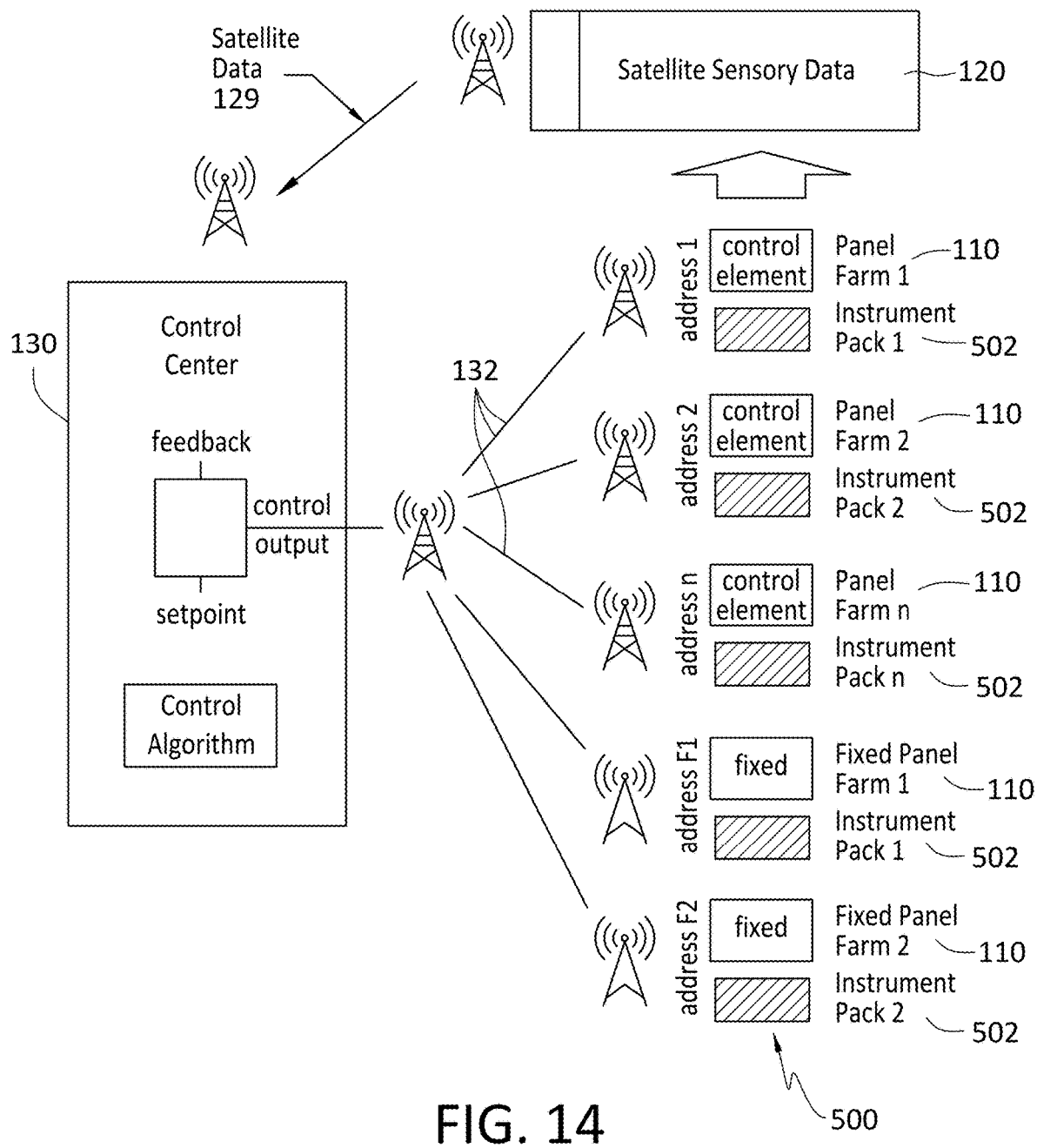
FIG. 14 is a schematic diagram showing one option for command and control of the global climate control system according to the invention.

FIG. 14 shows one option for an overall communication and control scheme for the inventive system 10 for moderating energy absorption at the earth's surface. Each panel unit grouping (panel farm) 500 has an associated instrument pack 502 to provide localized data, such as temperature, humidity and insolation, which can be accessed and analyzed by the Command Center 130. In addition, the satellite data systems (maintained by NASA and NOAA) 120 collect and share a wide variety of historical and real time information on planetary systems. In addition to planetary shortwave and longwave emissions (critical to energy budget factors) there is information on cloud cover, greenhouse gas concentrations, humidity, surface temperature, sea level, etc. Such data 129 also can be accessed and analyzed by the Command Center 130.

As shown in FIG. 14, some of the panel units 110 may be disposed with a fixed bias, wherein the panels in such panel units 110 are fixed in the cardinal position of reflective orientation. These fixed bias panels would not rotate, if deemed safe and appropriate for the location at which the panel units have been deployed. Including some number of fixed bias panels should case complexity and reduce fabrication, installation, control and maintenance costs of the system.

The system 10 for moderating energy absorption at the earth's surface according to the invention is not merely a temperature control system intended to operate on thermal feedback alone. Temperature forcings (the panels 100, 600 of the panel units 110, 610) will provide positive or neutral effects on climate as a whole, on both a local, regional, and global basis. Long term average goals shall be built on a minute by minute, day/night, and seasonal basis owing to the wide range of time constants associated with various aspects of the earth's climate (which may take years). With the current invention, major planetary circulation patterns, both atmospheric as well as oceanic, will not be influenced adversely. The system 10 is designed to avoid these problems by having programmable control elements, along with high spatial distribution. Flexibility for the deployment of the panel units 110, 610 and panels 100, 600 along with flexibility of how the panel units 110, 610 and panels 100, 600 will be controlled by control elements shall be keys to success.

Because of the complexity of atmospheric variables, such as cloud cover versus clear sky conditions along with changing concentrations of greenhouse gases, it will not be feasible to use a simplistic control algorithm for optimum control of the system according to the invention. Instead, the system is designed and targeted to support Adaptive Control, and ultimately, Intelligent Control. Each of these control schemes will require adequate feedback on the critical variables associated with the desired effects on the climate system as whole. Feeding back the immense array of satellite data, along with localized measurement data, are key to the optimum control of the system.

Because of the large number of panel unit farms 500 that will be needed for the system to have a detectable impact to reduce climate change, it is anticipated that panel units 110, 610 will be manufactured and installed on a piecemeal basis over a period of years. It may be necessary to try different prototypes of panel unit test farms to measure efficacy of panel surfaces under various atmospheric conditions. Novel capabilities of the current inventive system, such as perfect black body radiators and IR reflectance, along with control dynamics, are not currently used in existing geoengineering solutions.

Figure 15:
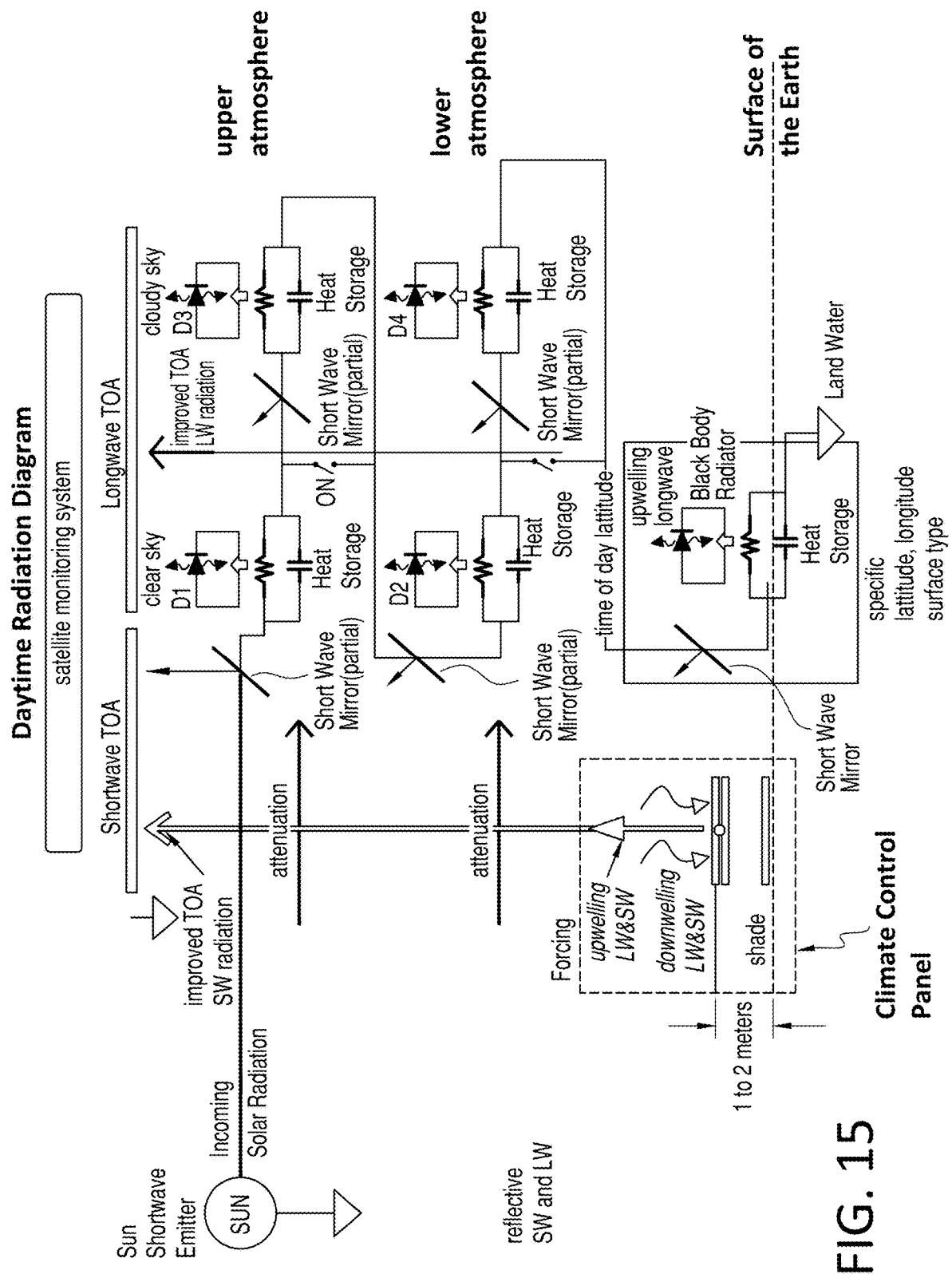
FIG. 15 is a schematic diagram modelling a climate control system according to the invention in a daytime use configuration.
Figure 16:
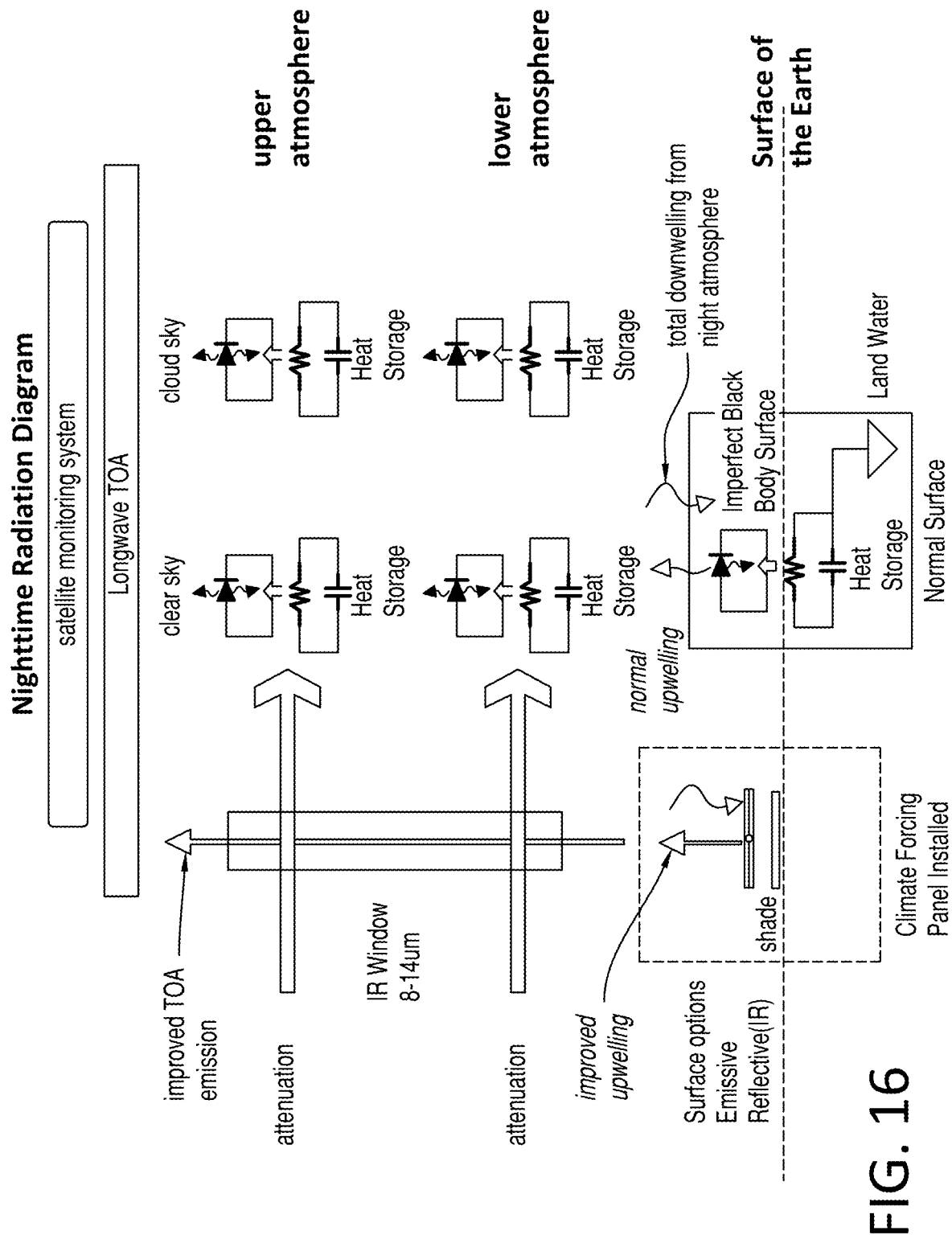
FIG. 16 is a schematic diagram modelling a climate control system according to the invention in a nighttime use configuration.

FIGS. 15 and 16 model the control algorithms for the inventive dynamic system to moderate energy absorption (both longwave and shortwave radiation) at the earth's surface in daytime and nighttime conditions. FIG. 15 illustrates modified heat transfer at the earth's surface with and without deployment of the climate control panel units according to the invention during daylight or daytime hours. The top of atmosphere radiative heat factors ultimately are influenced by the differential performance of a given surface region relative to an adjacent region when the climate control panel units are installed and controlled according to the invention.

Under normal circumstances, with radiative heat transfer, downwelling radiation, both shortwave and longwave from the atmosphere is absorbed by the earth's surface (land or water), upwelling radiation from the surface travels upwardly and will be attenuated and absorbed by atmospheric gases and/or clouds, with some portion escaping from the earth's atmosphere. The normal amount of upwelling radiation is a function of the surface temperature and the surface structure (whether sand, soil, rock, water, etc.). A partial reflection of shortwave radiation, based on surface ALBEDO, will be reflected upwardly, some of which is absorbed by the atmosphere and some of which escapes from the earth's atmosphere. FIG. 15 shows that with the panel units installed, the panel surfaces substitute for normal surface properties. This substitution can result in an increase of reflectivity by more than nine times in many cases. The region subtended by a panel is shown as shaded in FIG. 15. The diagram for daytime radiation (FIG. 15) takes into account whether there is cloud cover, which impacts what is experienced at the earth's surface. Cloud variables, in terms of presence or absence, are shown to have switches (on/off) to simulate impacts.

FIG. 16 illustrates modified heat transfer at the earth's surface with and without deployment of the climate control panel units according to the invention during darkness or nighttime hours. In contrast with what is shown in FIG. 15, the model in FIG. 16 shows removal of the sun. The top of atmosphere radiative heat ultimately is affected by the differential performance of a given surface region relative to an adjacent region with the climate control panel units installed. Under normal circumstances, with radiative heat transfer, downwelling radiation, both shortwave and longwave from the atmosphere is absorbed by the earth's surface (land or water), upwelling radiation from the surface travels upwardly and will be attenuated and absorbed by atmospheric gases and/or clouds, with some portion escaping from the earth's atmosphere. The normal amount of upwelling radiation is a function of the surface temperature and the surface structure (whether sand, soil, rock, water, etc.). The spectral properties of these surface types vary, and all fall short of ideal blackbody radiators.

With the panel units according to the invention installed, the panel surface substitutes for the surface properties of the earth, and can act either as an IR reflector or as a perfect black body emitter, depending upon panel orientation. In either case, the region subtended by a panel is shown as shaded in FIG. 16. When viewing FIG. 16, the model takes into account that atmospheric conditions will be considered both with and without cloud cover, which cloud cover creates dramatically different situations.

Figure 18:
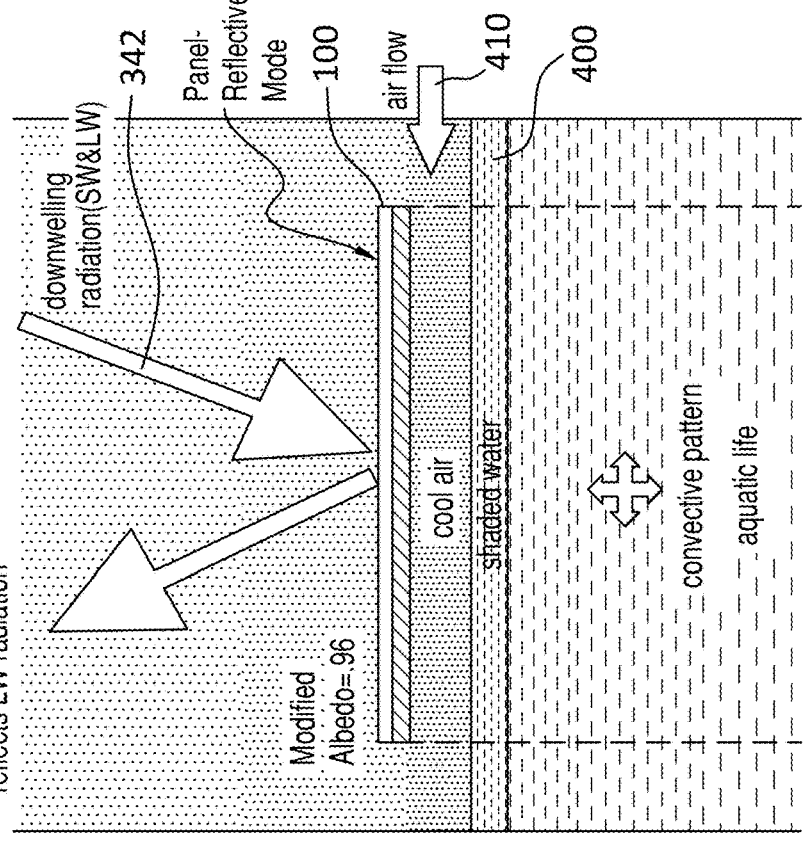
FIG. 18 is a schematic diagram of a panel unit of the invention deployed over the water surface and showing reflection of shortwave radiation by the panel unit.
Figure 17:
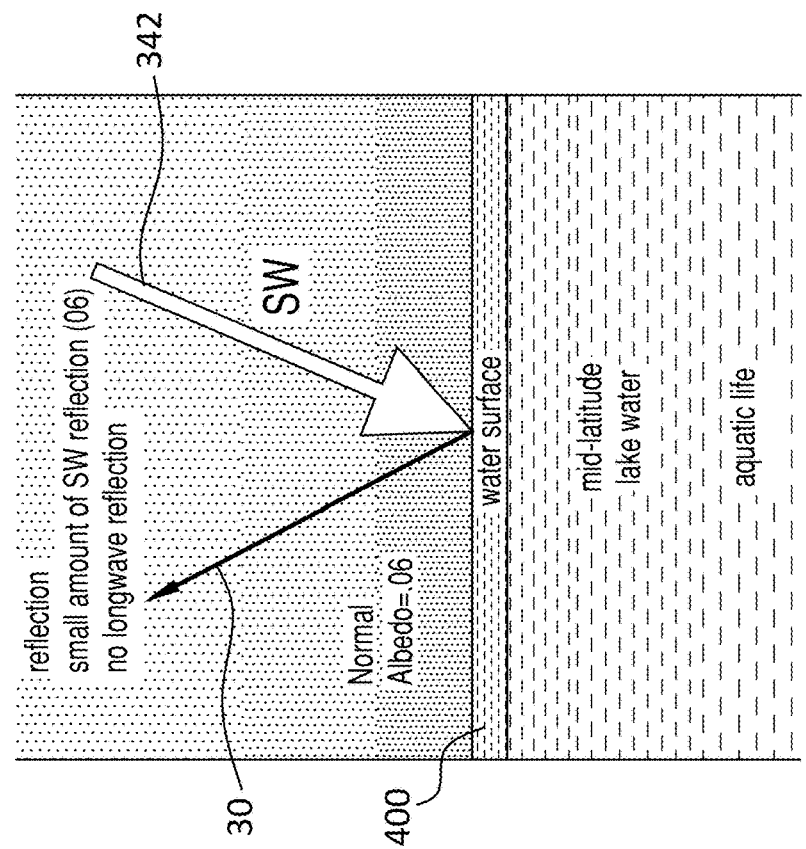
FIG. 17 is a schematic diagram of a lake surface showing reflection of shortwave radiation by the water surface.

The inventive system also has advantages when panel units 110, 610 are installed over bodies of water, such as lakes or oceans. In the current application "earth surface" is intended to encompass not only land masses, but also bodies of water. As shown in FIGS. 17 and 18, the panels 100 when installed over a body of water 400 in a reflective orientation shade the water below the panel unit 110, and reflect both shortwave 30 and longwave 350 radiation away from the lake water. Cool air 410 flows between the panel unit 110 and the water surface 400. Lake water temperature decreases in proportion to the percent of the lake surface that is covered by panel units 110. When installed on a lake surface, the panel unit 110 may be secured to a frame that is cantilevered from a shore, or the panel unit may be mounted to a buoyant frame. Such panel unit 110 also could be installed on an ocean surface. In such case, the panels 100 may be mounted to buoyant frames, such as made of high density polypropylene that resists decay from exposure to water, salt water, other contamination and weather impacts.

EXAMPLES

Desert Mounting—Tabuk Province in Saudi Arabian Desert

Tabuk Province in Saudi Arabian Desert, coordinates
   Latitude: 28.465899
   Longitude: 37.361435
   The Direct Normal Radiation, averaged (over the course of a year) is given as 7349 W/m$^2$ per day. Using the conversion factor of 0.04166, we get an average insolation of 306 W/m$^2$ direct normal radiation (panels tracking the sun to maintain normal angle). Using this data along with constants:
   20% attenuation by desert atmosphere of incoming insolation
   25% reflectivity of sand
   95% reflectivity of aluminum
we can construct Tables 3 and 4 below, illustrating downwelling and upwelling radiation. In addition, the Tables 3 and 4 include 50% of the heat absorbed in the atmosphere as being radiated to space as long wave (LW) radiation.

TABLE 3

WITH PANELS (Units: W/m²)

| Desert with Alum Reflection | Downwelling | Upwelling(SW) | Upwelling(LW) | Total Emission |
|---|---|---|---|---|
| Daily Average (insolation) | 367.4 | 232.7 | 29.1 | 261.8 |
| Attenuation | 0.2 | 0.2 | | |
| Atmospheric Heat Absorbed | 73.5 | 58.2 | | |
| Ground (SW) | 306.2 | 290.9 | | |
| Reflect (Alum) | | 0.95 | | |

TABLE 4

Without Panels (Units: W/m²)

| A<br>Desert (sand = 25% albedo) | B<br>Downwelling | C<br>Upwelling(sw) | D<br>Upwelling(LW) | E<br>Total Emission |
|---|---|---|---|---|
| Insolation | 367.4 | 61.2 | 7.7 | 68.9 |
| Atmospheric Attenuation | 0.2 | 0.2 | | |
| Atmosphere Heat Absorbed | 73.5 | 15.3 | | |
| Ground Level | 306.2 | 76.5 | | |
| Reflect (Albedo Sand) | | 0.25 | | |

The computations in Tables 3 and 4 show a net improvement of emissions from the earth to outer space. 261.8 W/m²−68.9 W/m²=193 W/m².

The Current Imbalance at Top of Atmosphere (TOA)

A typical reference for overall TOA imbalance is as follows: https://theconversation.com/earths-energy-budget-is-out-of-balance-heres-how-that's-warming-the-climate-165244: "Almost all of the absorbed energy is matched by energy emitted back into space. However, a residual now accumulates as global warming. That residual has increased, from just under 0.6 watts per square meter at the end of the last century to 0.79 in 2006-2018, according to the latest data from the Intergovernmental Panel on Climate Change. The vast majority of that is now heating the oceans. While it might sound like a small number, that energy adds up."

To compensate or cancel this increase on a yearly basis, we compute as follows $$0.79 - 0.6 = 0.19 \text{ W/m}^2 \text{ over a 120 years span.}$$

This amounts to =0.19 W/m²/120 years=0.001583 W/m² per year growth.

To compensate or cancel this yearly growth, we can compute the panel coverage required (base on SW reflections) as follows:
Ratio of Panel Forcing to Panel Requirements $$188/0.001583 = 118737$$

The portion of the surface area of the earth needed can be computed as follows:

Total surface area of the earth: $5.10E + 14$ Square Meter

Fraction of coverage needed: $5.10E + 14/118737 =$ $$4.18E + 9 \text{ square kilometers (1614 square miles).}$$

Surface Energy Budget

The key component of global warming is typically put in terms of surface heating problems due to yearly increases in GHG emissions, where the primary component is $CO_2$ emissions caused by fossil fuel burning. With panels, the shortwave (SW) energy absorbed (heating) by the panels at the surface can be shown as follows. From Table 3 above we show:
306 W/m² ground insolation
290 W/m² reflected
which represents: 306−290=16 W/m² absorbed by the earth.
The SW radiation without panels is (Table 4 above)
306 W/m² ground insulation
76.5 W/m² reflected
which represents 306−76.5=229.5 W/m² absorbed by earth. In total, the panels provide an improvement of: 229.5−16=213.5 W/m².

Perspective on the Surface Energy Budget

The most critical component leading to surface heating by greenhouse gases is considered to be the emission of $CO_2$ gas attributed to fossil fuel burning. Worldwide these $CO_2$ emissions occur at a rate of 40 billion tons per year. The equivalent forcing of this emission is given in the literature as 0.031 W/m². The ratio of the panel improvement verses yearly increases in $CO_2$ forcing is: 213.5/0.031=6871. The portion of the earth's surface that is needed to achieve this improvement by the SW reflections to cancel out one year's worth of $CO_2$ emissions can be computed as follows:

Total surface area of the earth: $5.10E + 14$ Square Meter

Fraction of coverage needed: $5.10E + 14/6871 =$ $$74,200 \text{ square kilometers (28,648 square miles).}$$

The net effects of the panels according to the invention including shading and nighttime effects is estimated to be at least twice this efficacy, yield approximately 14,300 square miles (1329 km²). Cooling goals can be further reduced if current green energy emissions can provide 50% correction which would then require only 50% of panel compensation, or 7,150 square miles (665 km²).

The present invention outperforms other proposed engineered approaches to controlling heat flux in relation to the earth's energy budget. The panels of the panel units of the present invention can be installed at optimum latitudes over land and water masses, and can be controlled by a real-time feedback control system, preferably in coordination. The panels offer an adjustable solution that is responsive to empirical data, both real-time and historic. The data include variables such as cloud activity, temperature, humidity, atmospheric gas composition, and variations in insolation. Such data is currently available via satellites used for weather predictions and climate science studies and via ground stations. The number of panels, their location, and their orientation (over a full range of reflectivity of 0 to 1 as rotated) can be monitored and changed in response to the changing data.

Conversely, other engineered approaches that have been proposed lack real-time control and are considered open loop systems. For example, painting surfaces of the earth or structures on the earth, such as roofs and roadways, can only be done in limited regions and is not programmable or adjustable to changing conditions. Planting crops that have more reflectivity can only be done in limited regions and also is not programmable or adjustable to changing conditions in real time. Laying reflective foam on the ocean surface can only be done in limited regions and also is not programmable or adjustable to changing conditions in real time. Injecting reflective aerosol particles into the atmosphere cannot be controlled beyond the initial release points and times.

Another challenge arising from climate change is the heat island effect experienced by persons living and working in urban environments, particularly large cities lacking substantial green spaces with tree canopies. The buildings, the pavement and the road surfaces heat up from sunlight, and continue to radiate heat energy throughout the day and night. Surface mounted panel units 610 such as shown in FIGS. 19-23, are perfectly suited to be installed in these urban environments. The panels 600 have a reflective surface 602, and an emissive surface 604 opposite the reflective surface 602. The radiation reflecting surface 602 is highly reflective to shortwave and longwave solar radiation, preferably 95% reflective. The radiation emissive surface 604 ideally is a black body radiator. The panels 600 are joined to or integrally formed with a shaft 612. The ends of the shaft 612 extend beyond the side edges of the panel 600. Each panel 600 is supported for rotation above a ground surface, such as but not limited to a sidewalk or a rooftop or a parking lot. A pair of support posts 620, 620' is spaced apart a distance to accommodate the length of a panel 600. Bearings 622, 622' associated with the support posts 620, 622' accommodate the shaft 612, so that the shaft 612 is rotatable with respect to the support posts 620, 620'. One end of the shaft 612 is connected for rotation to a motor 150, such as but not limited to a stepper motor. Multiple pairs of posts may be installed to support multiple panels to create a panel unit 610. One or more sensors 640, such as temperature and humidity sensors, may be installed on the respective support posts 620. Preferably, the sensors 640 transmit data to the programmable controller associated with the panel unit 610.

During daytime, the radiation reflective surface 602 is directed upwardly to maximize the amount of short wave and long wave radiation directed up into the atmosphere. Each panel 600 shades the ground or other surface thereunder, keeping the surface temperature lower than it would have been without the panel in the daytime mode. At nighttime, the panel 600 is rotated into the radiation emissive orientation so that the radiation emissive surface 604 is directed upwardly to maximize emissions of long wave radiation away from the panel unit 610 into the atmosphere. Advection or air currents develop at and under the panel units 610 to distribute cooling effects below the panel units 610.

Wind (advection) and convection may enhance the heat transfer between the panels 600 and the surrounding air. Such advection and convection at the same time promote distribution of the cooling effects also to regions surrounding the panel units 610.

When cooling effects are not desired, the panels 600 may be positioned in the neutral orientation (see FIG. 19). Moreover, the programmable controller may be programmed to rotate the panels 600 to desired angular orientations during the day so as to maximize the reflection of radiation by the reflective surface 602. The panels 600 may track the sun angle.

Figures 24, 25:
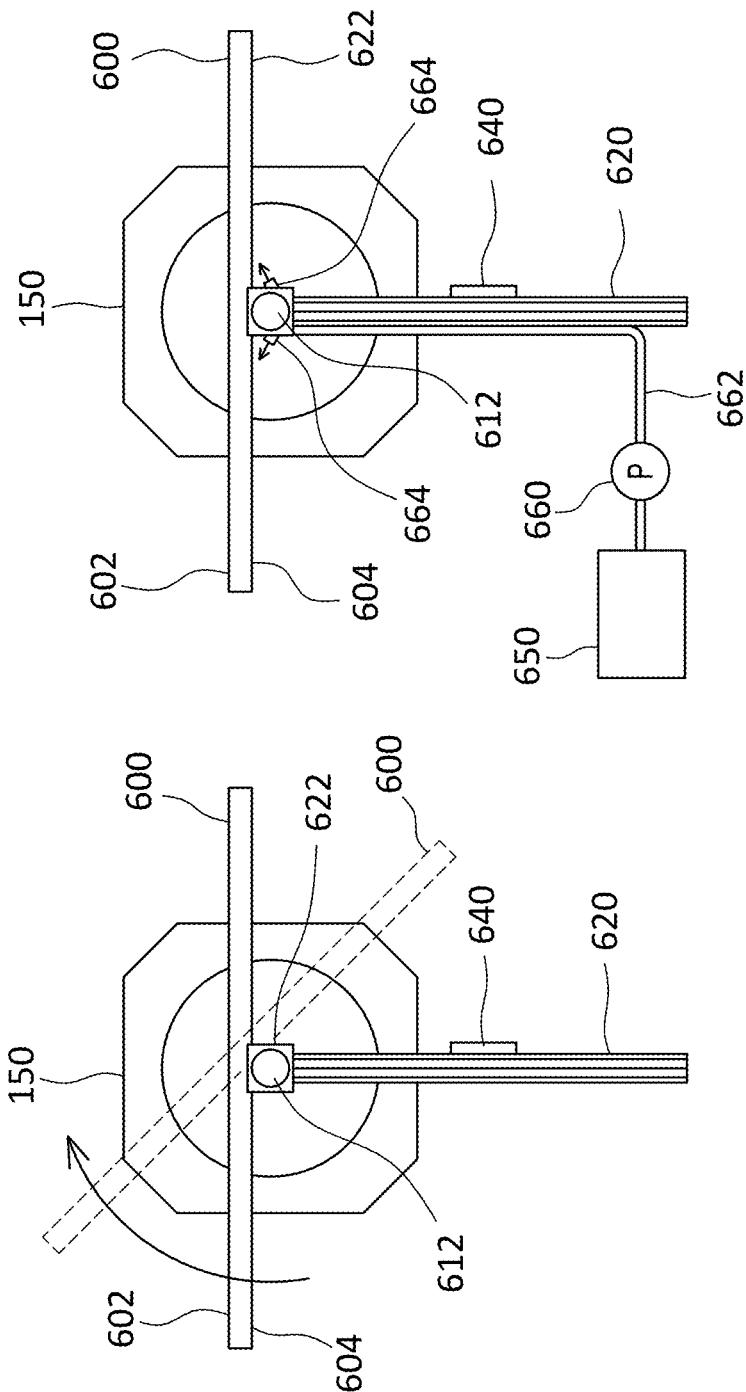
FIG. 24 is a right side elevational view of a panel mounted on a shaft that is supported by bearings within support posts, which panel rotates as the shaft is spun to create eddy currents (wind) in the ambient air surrounding the panel.
FIG. 25 is a right side elevational view of a panel mounted on a shaft that is supported by bearings within support posts, wherein water is pumped from a water source and sprayed or applied onto at least a portion of the emissive side of the panel to generate an evaporative cooling effect.

In one advantageous embodiment shown in FIG. 24, the shafts 612 of the panels 600 can be rotated either clockwise or counter-clockwise about their axes of rotation at a desired rotational speed to cause the panels 600 to generate eddy currents in the ambient air circulating above and/or below the panel unit 610. In such embodiment, the panels 600 have a fanning function rather than a radiation reflective or radiation emissive function.

In still another advantageous embodiment shown in FIG. 25, water is pumped from a water source 650 by a pump 660 through conduit 662 and sprayed by jets 664 or nozzles onto the radiation emissive surface 604 of the panel 600 to enhance cooling in the subtending region below the panel unit 610. The conduit 662 may feed a manifold or tube within the turning shaft 612. The spray jets 664 may comprise holes in the tube or added nozzles extending from the manifold to distribute water to the radiation emissive surface 604 that is opposite the radiation reflective surface 602. The water is distributed to the radiation emissive surface 604 through capillary action. The emissive surface 604 of the panel 600 comprises a porous material, such as a sintered plastic. As water held in the pores of the emissive surface 604 evaporates, an evaporative cooling effect is experienced in the subtending region below the panel unit 610. The emissive surface 604 of the black body radiator will have a lower surface temperature, which will in turn lower ambient air and land surface temperatures in the subtending shaded region 674.

Figure 26:
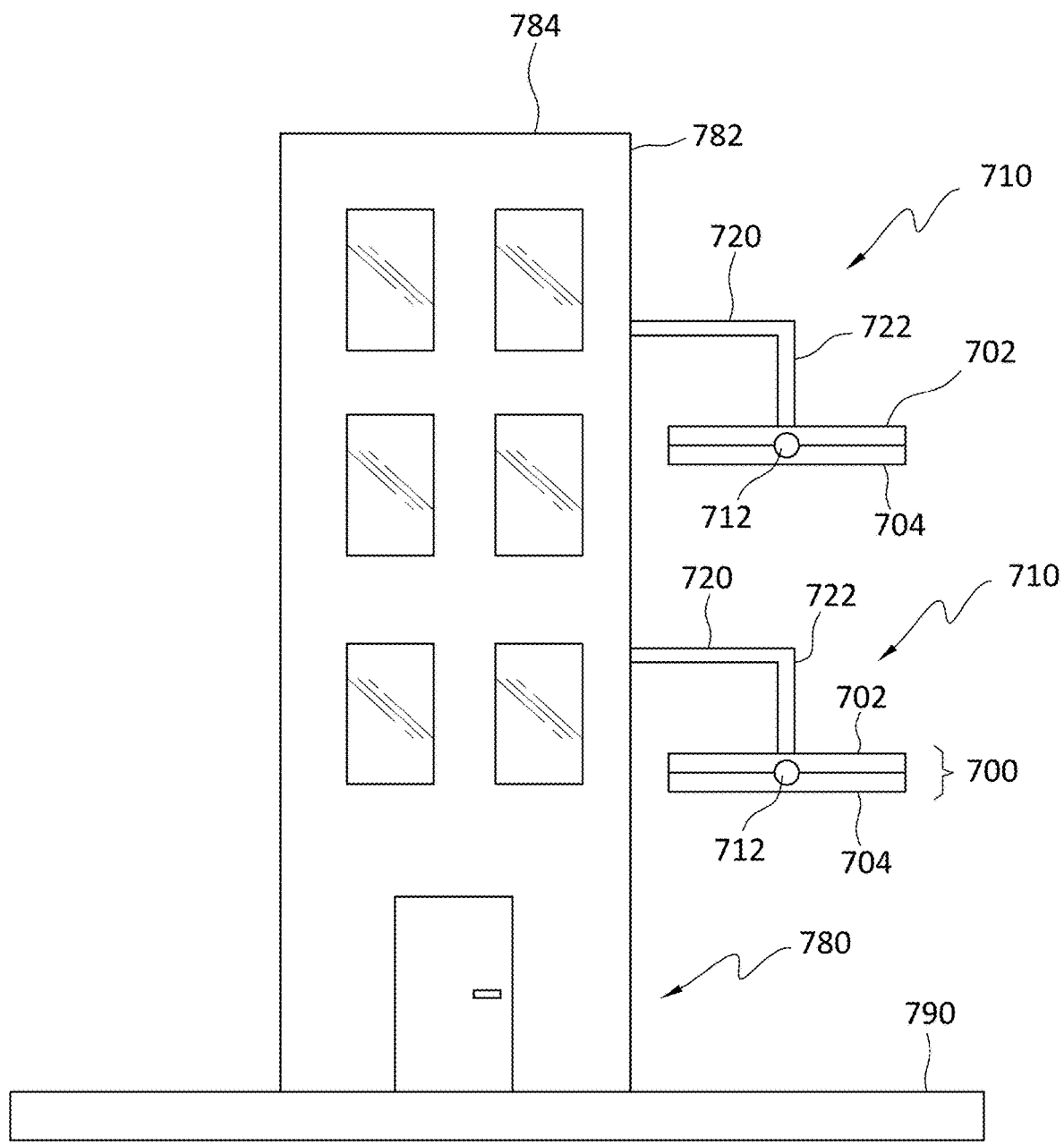
FIG. 26 is a schematic view of a city building with two panel units mounted to a vertical wall with the panels oriented with reflective surfaces upward to reflect short wave and IR radiation upwardly to the atmosphere so as to cool a subtending region below the panel units.
Figure 27:
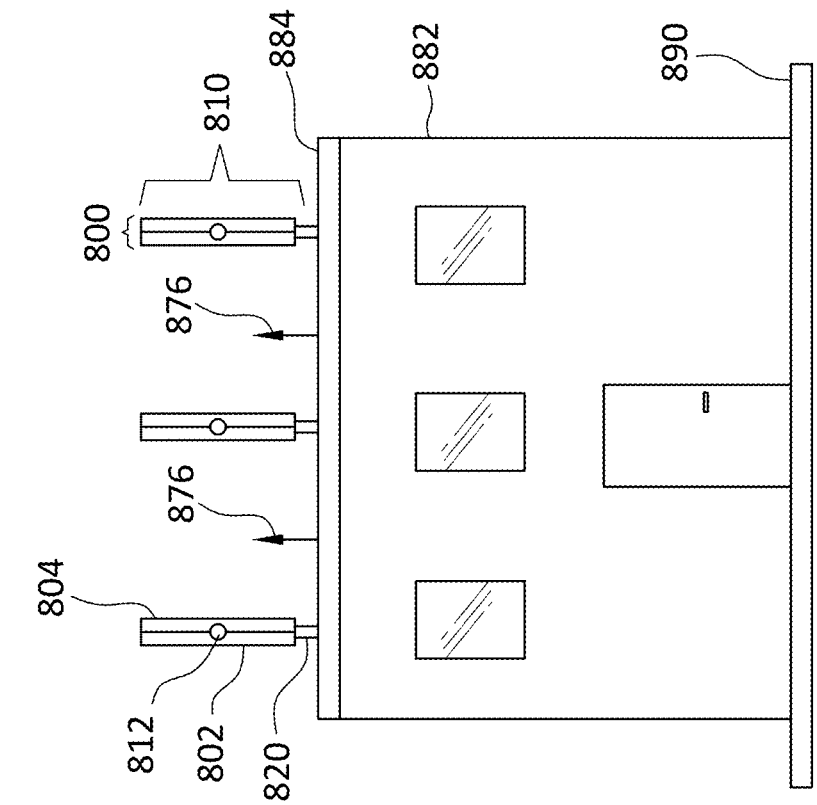
FIG. 27 is a schematic view of a city building with three panel units mounted on the building roof with the panels oriented with reflective surfaces angled to reflect short wave and IR radiation upwardly to the atmosphere so as to cool a subtending region of the roof below the panel units.
Figure 28:
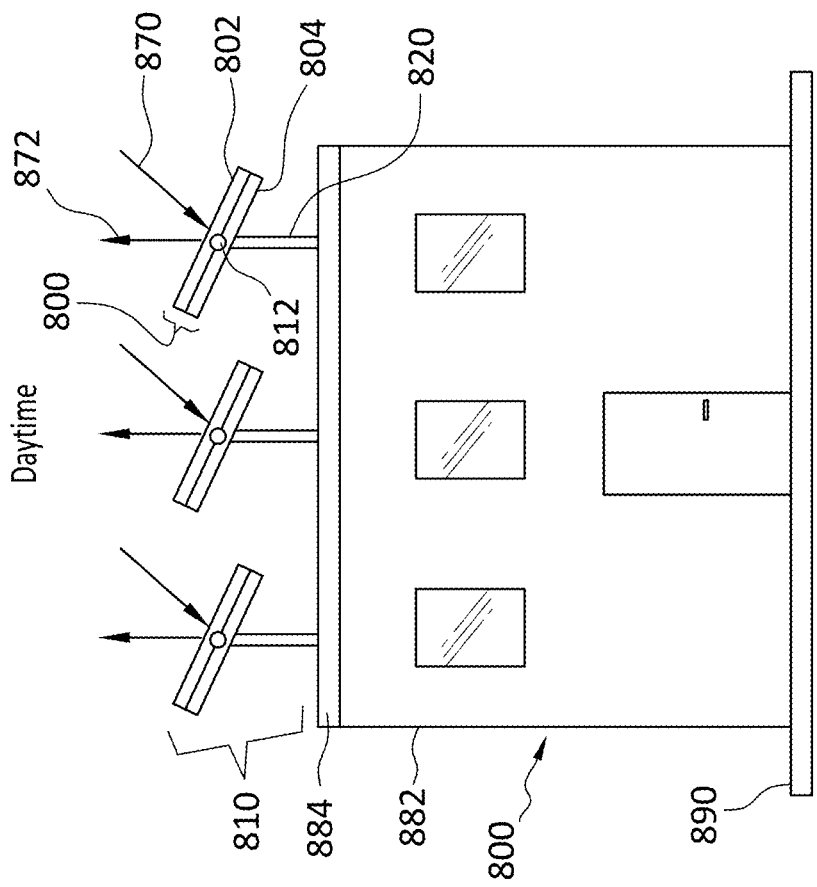
FIG. 28 is a schematic view of the city building with three panel units as shown in FIG. 27, but having the panel units oriented in neutral position so that IR radiation is emitted away from the building roof for nighttime cooling.
Figure 29:
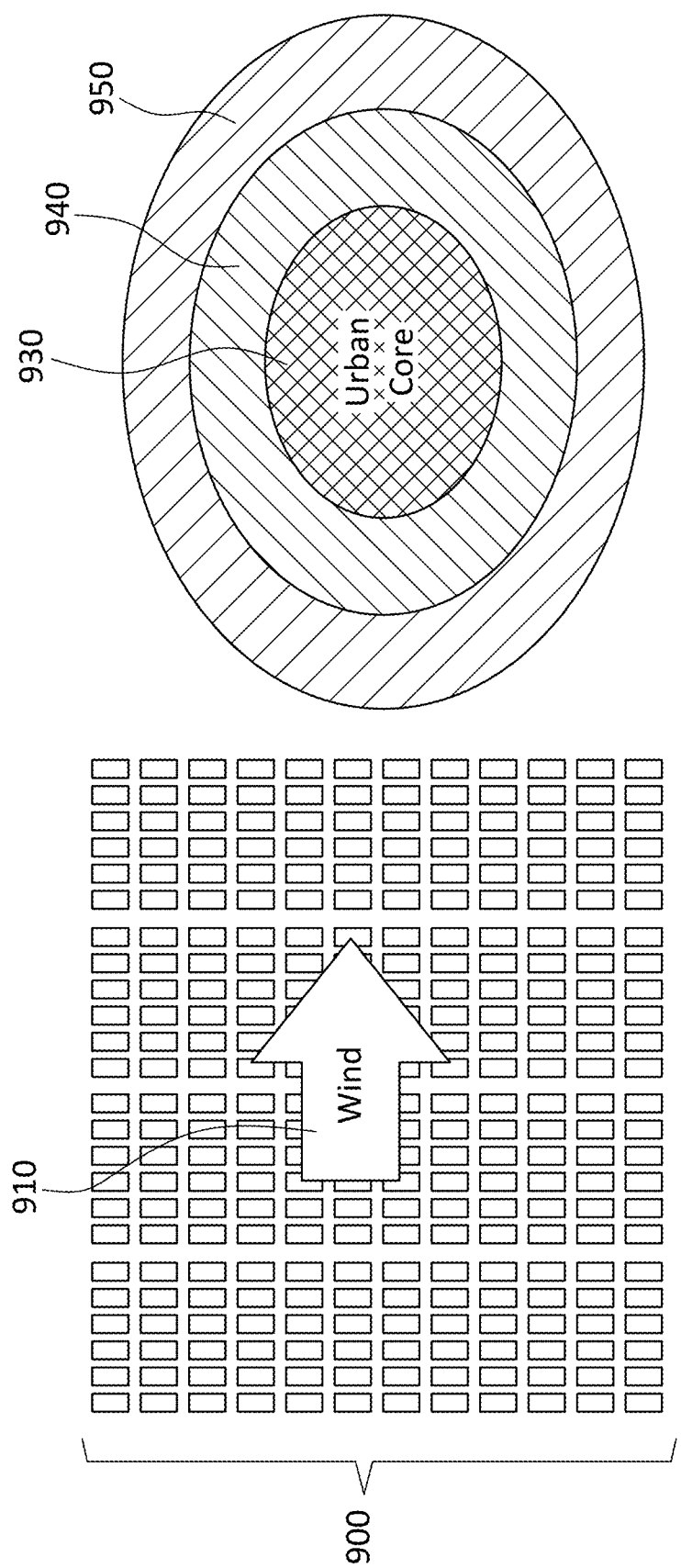
FIG. 29 is a schematic view of a large scale array of panel units installed in a location outside the perimeter of an urban core, so that the panel orientations may be controlled to circulate sea breezes or prevailing winds toward the urban core.

FIGS. 26-28 show configurations for mounting panel units 710, 810 on buildings 780, 880. Referring first to FIG. 26, two panel units 710, are mounted to a vertical exterior wall 782 of a building 780 by mounting brackets 720 with bracket arms 722. The panels 700 of the panel units 710 are mounted for rotation to shafts 712. The shafts 712 are operatively connected to motors and control systems comparable to those shown for the embodiment of FIGS. 19-22. Each panel 700 has a radiation reflective surface 702 and a radiation emissive surface 704 opposite the radiation reflective surface 702. The panels 700 may be rotated about shaft 712 to orient the radiation reflective surface 702 upwardly to reflect shortwave and IR radiation away from the building or away from the walkway surface 790 in the subtending region below the panels 700. FIG. 26 shows the panels 700 with the radiation reflective surfaces 702 upwardly directed to reflect radiation away, shading the subtending region below the panel units 710. The panels 700 may be rotated to a neutral orientation or to a radiation emissive orientation (not shown in FIG. 26), or to other rotational positions as optimized in response to weather conditions, air temperature, time of day and/or other factors, including but not limited to relative humidity at the panel unit, position of the panel unit, position of a second panel unit in a grouping of panel units, radiation insolation, top of atmospheric data, and combinations thereof.

FIGS. 27 and 28 show an array of three panel units 810 installed on a rooftop 884 of a building 880. In FIG. 27, the panels 800 of the panel units 810 are shown in a daytime orientation, positioned at an angular orientation to direct incoming solar radiation denoted by arrow 870 away from the building roof 884 and toward the outer atmosphere as denoted by arrow 872. The radiation reflective surface 802 of each panel 800 is positioned by rotating the panels 800 to a desired angular orientation deemed optimum to receive the incoming solar radiation 870. In this daytime orientation, the subtending region of the roof 884 under the panel units 810 is cooled by shading. The panel units 810 are installed onto posts 820 secured to the roof 884.

In comparison, in the nighttime orientation shown in FIG. 28, the panels 800 of the panel units 810 are rotated to a neutral position. In this distinct night mode, the panel units 810 do not reflect radiation away from the building 880, and their neutral angular orientation maximizes the diurnal emission of radiation from the roof surface 884 to the atmosphere in the direction denoted by arrows 876. This enhances radiative cooling of the building at night. If desired, the panels 800 of the panel units 810 may be rotated to positions that direct the radiation emissive surfaces 804 toward the outer atmosphere.

FIG. 20 schematically depicts deployment of a large scale array 900 of panel units in a geographic region outside of the perimeter of an urban center/urban core 930 or modern city. The array 900 is located in a region of known wind circulation or prevailing wind spaced from the urban core 930, perimeter region 940 around the urban core, and suburban region 950. Panels in the panel array 900 are rotated to positions (controlled by central controller) either to direct a prevailing wind denoted by arrow 910 toward the urban core 930. One example of a prevailing wind is a sea breeze. The selective cooling of subtending regions below the panel units by orienting the reflective surfaces of the panels enhances temperature gradients that impact the prevailing wind flow and direction for mesoscale cooling of an urban center 930 benefiting from the array of panel units of the system for moderating energy absorption at the earth's surface. Optionally, some of the panels of the panel units of the array 900 may be rotated at rotational speeds sufficient to fan the air above the panel units, creating air circulation or enhancing air circulation that may be directed toward the urban center.

Additional objectives, advantages, features and application possibilities of the present invention ensue from the description of embodiments making reference to the drawings. In this context, all of the described and/or depicted features, either on their own or in any meaningful combination, constitute the subject matter of the present invention, also irrespective of their compilation in the claims or the claims to which they refer back.

REFERENCE NUMERALS 24 thermals
30 radiation reflected by surface
40 atmospheric window
67 radiation absorbed by atmosphere
77 radiation reflected by clouds, aerosol and atmosphere
78 evaporative transpiration
100, 100' panels or forcings
102, 102' radiation reflective surface
104, 104' radiation absorptive surface
107 reflected solar radiation
110, 110' panel units
112, 112' shaft
114 frame
116 air passageways in frame
120 monitoring satellites
124 earth surface, includes land masses and bodies of water
128 weather conditions—radiation, cloud cover, moisture, temperature
129 top of atmosphere measurements
130 global climate command and control center (GCCC)
132 control signal(s) from GCCC
140 sensors on panel units
142 feedback from sensors
150 motor
165 radiation emitted by atmosphere
168 radiation absorbed by earth surface
170 subtended region below panel unit
172 shaded region
235 outgoing longwave radiation
300 fan
302 arrow showing fan rotation
304 air flow directed under panel
324 back radiation absorbed by earth surface
342 incoming solar radiation
350 surface radiation
390 surface radiation
392 radiation emitted by black body
400 water surface
410 air flow
500 panel farm
502 instrument pack
600 panel
602 radiation reflective surface
604 radiation absorptive surface/radiation emissive surface
610 panel unit
612 shaft
620, 620' support post
622, 622' bearing
640 sensor on support post
650 water source
660 pump
662 conduit
664 spray jets
672 shaded region
674 shaded region
700 panel
702 radiation reflective surface
704 radiation absorptive surface/radiation emissive surface
710 panel unit
712 shaft
720 mounting bracket
722 bracket arm
780 building
782 vertical wall of building
784 roof of building
790 walkway
800 panel
802 radiation reflective surface
804 radiation absorptive surface/radiation emissive surface
810 panel unit
812 shaft
820 support post
870 incoming shortwave and IR radiation
872 reflected shortwave and IR radiation
876 emitted IR radiation
880 building
882 vertical wall of building
884 roof of building
890 walkway
900 array of panel units
910 wind direction
920 urban heat island 930 urban core (most paved or hard construction)
940 perimeter region
950 suburban region
1000 panel
1100 fixed bias panel unit

The invention claimed is:

1. A system for moderating energy absorption at the earth's surface, comprising:
a panel unit open to atmosphere that is configured to support at least one rotatable shaft;
a panel joined to or integrally formed with the shaft, said panel having a radiation reflective surface and a radiation emissive surface opposite the radiation reflective surface; and
means for rotating the shaft to place the panel selectively into each of a plurality of predetermined cardinal positions selected from the group consisting of: reflective orientation, emissive orientation and neutral orientation; and
at least one programmable controller configured to control the means for rotating the shaft (a) in response to localized data comprising weather data, air temperature at panel unit data, time of day at panel unit data, and/or orientation of the panel data, and (b) in response to satellite data on upwelling longwave radiation emissions; and
wherein air from outside the panel unit flows around the panel irrespective of panel orientation.

2. The system of claim 1, wherein the radiation reflective surface comprises aluminum.

3. The system according to claim 1, wherein the programmable controller receives at least one additional data selected from the group consisting of: relative humidity at the panel unit, position of the panel unit, position of a second panel unit in a grouping of panel units, radiation insolation, top of atmosphere data, and combinations thereof.

4. The system according to claim 1, wherein the panel unit comprises a frame, and said frame defines air passageways to direct air below the panel.

5. The system of claim 4, further comprising a fan to direct air below the panel.

6. The system according to claim 1, wherein the panel unit is mounted spaced a distance of at least about 1 meter above a ground surface or a water surface.

7. The system according to claim 1, wherein the panel unit is mounted spaced at a distance of between 1 meter and 3 meters above a ground surface or a water surface.

8. The system according to claim 1, wherein the panel unit is mounted onto an exterior surface of a building.

9. The system according to claim 1, further comprising a plurality of additional panel units forming an array.

10. The system according to claim 1, further comprising a fixed bias panel unit in which all or substantially all panels therein have panel surfaces maintained in the reflective orientation.

11. The system according to claim 1, further comprising a fixed bias panel unit in which all or substantially all panels therein have panel surfaces maintained in the emissive orientation.

12. The system according to claim 1, wherein the means for rotating the shaft includes a motor.

13. The system according to claim 1, wherein the means for rotating the shaft is configured to rotate the shaft for 360° about the shaft axis at sufficient rpm to create eddy currents in air.

14. The system according to claim 1, further comprising a pump configured to pump water from a water source through a conduit; and a sprayer operatively connected to the pump to spray the pumped water onto the radiation emissive surface of the panel.

15. A method for reducing radiation energy absorption at the earth's surface, comprising:
installing above the earth's surface a plurality of systems according to claim 1; and
selectively rotating the shafts of the panels of the panel unit with the means for rotating the shaft by programmable controller;
wherein the selective rotation of the shafts of the panels is determined in response to localized data comprising weather data, air temperature at panel unit data, time of day at the panel unit, and/or orientation of the panel data and in response to satellite data on upwelling longwave radiation emissions.

16. The method of claim 15, wherein selective rotation of the shafts of the panels and the second panels is determined in response to additional data received by the programmable controller selected from the group consisting of: top of atmosphere satellite data, relative humidity at panel units, position of panel units, radiation insolation, and combinations thereof.

17. The method according to claim 15, wherein the radiation reflective surfaces of the panels reflect shortwave radiation and longwave radiation.

18. The method according to claim 15, wherein the panel units of the systems are installed over land masses.

19. The method according to claim 15, wherein the panel units of the systems are installed in urban areas.

20. The method of claim 15, wherein the panel units of the systems are installed on a building roof and/or on a building wall.

21. The method according to claim 15, wherein the panel units of the systems are installed over water masses.

22. The method according to claim 15, wherein the panel unit is mounted so that the panels are spaced at a distance of between 1 meter and 3 meters above a ground surface or a water surface.

23. The method according to claim 15, wherein the panels may be variously rotated to place the panels at a predetermined one of each of the cardinal positions, as well as to at least one predetermined rotational position that is between two of the cardinal positions.

24. The method according to claim 15, wherein rotational orientation of the panels of each panel unit of a multiplicity of panel units is dynamically controlled by the programmable controller.

25. The method according to claim 24, further comprising at least one fixed bias panel unit in which all or substantially all panels therein have panel surfaces maintained in a reflective orientation.

26. The method according to claim 24, further comprising at least one fixed bias panel unit in which all or substantially all panels therein have panel surfaces maintained in an emissive orientation.

27. The method according to claim 15, further comprising rotating the shafts of the panels for 360° about the shaft axis at sufficient rpm to create eddy currents in air.

28. The method according to claim 15, further comprising spraying water onto the radiation emissive surface of the panels.

29. The method according to claim 15, wherein at least one of the panels of each panel unit is selectively rotatable dynamically and in real-time.

30. The method according to claim 15, wherein the programmable controller includes feedback derived from localized data and satellite data systems.

\* \* \* \* \*